(12) United States Patent
Kawakami et al.

(10) Patent No.: US 7,976,945 B2
(45) Date of Patent: Jul. 12, 2011

(54) FLAME RESISTANT FIBER, CARBON FIBER AND PRODUCTION METHOD THEREOF

(75) Inventors: Daisuke Kawakami, Ehime (JP); Tetsunori Higuchi, Ehime (JP); Katsumi Yamasaki, Ehime (JP); Tomihiro Ishida, Ehime (JP); Koichi Yamaoka, Matsuyama (JP)

(73) Assignee: Toray Industires, Inc. (JP)

( * ) Notice: Subject to any disclaimer, the term of this patent is extended or adjusted under 35 U.S.C. 154(b) by 124 days.

(21) Appl. No.: 11/989,366

(22) PCT Filed: Aug. 4, 2006

(86) PCT No.: PCT/JP2006/315462
§ 371 (c)(1),
(2), (4) Date: Feb. 27, 2008

(87) PCT Pub. No.: WO2007/018136
PCT Pub. Date: Feb. 15, 2007

(65) Prior Publication Data
US 2008/0299389 A1 Dec. 4, 2008

(30) Foreign Application Priority Data

Aug. 9, 2005 (JP) ................................ 2005-230454
Dec. 27, 2005 (JP) ................................ 2005-374085
Jan. 16, 2006 (JP) ................................ 2006-007009

(51) Int. Cl.
*B32B 9/00* (2006.01)
*D01D 5/08* (2006.01)
*D01F 9/12* (2006.01)

(52) U.S. Cl. .......... 428/367; 264/178; 264/29; 264/182; 423/447; 423/448

(58) Field of Classification Search .................... 442/59; 264/29.2, 29.6, 29.7, 182; 423/447.4, 447.7, 423/447.8, 448
See application file for complete search history.

(56) References Cited

U.S. PATENT DOCUMENTS

| | | | |
|---|---|---|---|
| 3,900,285 A | | 8/1975 | Ono et al. |
| 3,923,950 A | | 12/1975 | Gump et al. |
| 4,644,066 A | | 2/1987 | Sonnenberg |
| 4,698,413 A | * | 10/1987 | Lynch et al. ............. 525/328.5 |
| 5,269,984 A | * | 12/1993 | Ono et al. ............. 264/29.2 |
| 5,314,950 A | | 5/1994 | Singh et al. |
| 2003/0158309 A1 | | 8/2003 | Ono et al. |
| 2003/0166812 A1 | | 9/2003 | Taniguchi et al. |

FOREIGN PATENT DOCUMENTS

| | | |
|---|---|---|
| JP | 48-45697 | 6/1973 |
| JP | 49-41698 | 4/1974 |
| JP | 49-54631 | 5/1974 |
| JP | 52-59799 | 5/1977 |
| JP | 52-63428 A | 5/1977 |
| JP | 62-57723 B2 | 12/1987 |
| JP | 63-14093 B2 | 3/1988 |
| JP | 63-211326 A | 9/1988 |
| JP | 2-14023 A | 1/1990 |
| JP | 3-816 A | 1/1991 |
| JP | 4-19219 A | 1/1992 |
| JP | 2636509 B2 | 4/1997 |
| JP | 10-130963 A | 6/1998 |
| JP | 11-12856 A | 1/1999 |
| JP | 11-152626 A | 6/1999 |
| JP | 2003-20516 A | 1/2003 |
| JP | 2004-3043 A | 1/2004 |
| JP | 2004-60126 A | 2/2004 |
| JP | 2004-183194 A | 7/2004 |
| WO | WO 2005/080448 A1 | 9/2005 |

OTHER PUBLICATIONS

Kaname et al.; Assignment of finely resolved C-13 NMR spectra of polyacrylonitrile. Polyme 42, (2001) 6323-6326.*
N.A. Kubasova et al., "Thermal Conversion of Polyacrylonitrile (PAN) in Solution," Polymer Science (USSR), 1968, vol. 10, pp. 1537-1542.
T. Takahagi et al., "XPS Studies on the Chemical Structure of the Stabilized Polyacrylonitrile Fiber in the Carbon Fiber Production Process," Journal of Polymer Science, Part A: Polymer Chemistry Edition, 1986, vol. 24, pp. 3101-3107.
Kensuke Okuda, "Carbon Fiber and Composite Material," Kyoritsu Shuppan, 1988, p. 17.
Wen-Yen Chiang et al., "Studies of Reactions with Polymers. VI. The Modification of PAN with Primary Amines," Journal of Polymer Science: Part A: Polymer Chemistry, 1990, vol. 28, pp. 1623-1636.
ed. Yutaka Maeda, "Recent Application Techniques and Market Expectation of Carbon Fiber," CMC Shuppan, 2000, pp. 1-39.

* cited by examiner

*Primary Examiner* — D. Lawrence Tarazano
*Assistant Examiner* — Ricardo E Lopez
(74) *Attorney, Agent, or Firm* — DLA Piper LLP (US)

(57) ABSTRACT

In a flame resistant fiber assembly obtainable by fiber forming a flame resistant polymer, a flame resistant fiber of a higher performance is obtained by improving fiber forming ability. A carbon fiber of a high performance is obtained by carbonizing the flame resistant fiber. At obtaining a flame resistant fiber by subjecting a solution containing a flame resistant polymer modified by an amine-based compound to a wet spinning or a semi-dry spinning in a coagulation bath in such a way that a degree of swelling of a coagulated yarn at the outlet of the coagulation bath is 100 to 1000 wt % and then, in a bath, subjecting to a drawing and/or water washing and to a drying under tension, the flame resistant fiber is produced by controlling temperature of the drawing bath/water washing bath, drying temperature or tension in such a way that the obtained fiber would not crystallize. A carbon fiber is produced by carbonizing the flame resistant fiber.

2 Claims, 1 Drawing Sheet

US 7,976,945 B2

FLAME RESISTANT FIBER, CARBON FIBER AND PRODUCTION METHOD THEREOF

RELATED APPLICATION

This is a §371 of International Application No. PCT/JP2006/315462, with an international filing date of Aug. 4, 2006 (WO 2007/018136 A1, published Feb. 15, 2007), which is based on Japanese Patent Application Nos. 2005-230454, filed Aug. 9, 2005, 2005-374085, filed Dec. 27, 2005, and 2006-007009, filed Jan. 16, 2006.

TECHNICAL FIELD

This disclosure relates to a flame resistant fiber, a carbon fiber and a production method thereof and, in more detail, it relates to a flame resistant fiber of which variation of elongation at break is small and suitable for obtaining a high performance carbon fiber, a high performance carbon fiber and a production method thereof.

BACKGROUND

Since flame resistant fiber is excellent in heat resistance and flame retardancy, it has been widely used, for example, for spatter sheets for protecting human body from high-temperature iron powder and weld sparks which are scattered in welding operation, and fire-resistant heat insulators for aircrafts, and its demand in these fields are increasing.

Further, the flame resistant fiber is important also as intermediate raw materials for obtaining carbon fiber. Carbon fiber has been, due to such various mechanical, chemical properties and lightweight properties, widely employed for various applications, for example, materials for aviation and space such as aircrafts and rockets, and sporting goods such as tennis rackets, golf shafts and fishing rods, and to be used also in fields for transport machines such as ships and cars. In addition, in recent years, the carbon fiber has been, due to its high electrical conductivity and heat releasing property, strongly required for application to electronic equipment parts such as housings for cellular phones and personal computer, and to electrodes of fuel cells.

Such a carbon fiber is generally obtained by a carbonization treatment of a flame resistant fiber by heating at a high temperature in an inert gas such as nitrogen. With regard to conventional flame resistant fiber, for example, a polyacrylonitrile (hereunder, abbreviated as PAN) based flame resistant fiber is obtained by making a PAN-based precursor fiber flame resistant (cyclization reaction and oxidation reaction of PAN) at a high temperature of 200 to 300° C. in the air.

However, this reaction to make flame resistant is an exothermic reaction and a reaction in a fibrous form, namely, in a state of solid-phase. Therefore, a long-time treatment is required for its temperature control, and the fiber thickness of the PAN-based precursor fiber needs to be limited to a fine size below a specific value to finish making flame resistant within a desired time. Thus, the presently known process of making flame resistant is unlikely to be regarded as a sufficiently efficient process.

As a method for solving the above-mentioned technical problems, a method of making solution by a solvent has been studied.

For example, a technique is disclosed in which an acrylonitrile- (hereunder, abbreviated as AN) based polymer powder is heated in an inert atmosphere until its density becomes 1.20 g/cm$^3$ or more, and thereafter dissolved in a solvent and made into a fiber, and the fibrous material is heat-treated (for example, refer to JP-S63-14093B).

However, there was a problem that, because an acrylonitrile polymer powder not well made into flame resistant is used, since viscosity change with time of the solution is big, a yarn breakage is likely to occur. Since a strongly acidic solvent such as sulfuric acid or nitric acid for easily decomposing ordinary organic polymers was used, an apparatus made of special materials having corrosion resistance needs to be used, etc., it was not practical in cost, too.

Further, a method is proposed such that a heat-treated acrylonitrile polymer powder and a not heat-treated acrylonitrile polymer powder are mixed and similarly dissolved in an acidic solvent (for example, refer to JP-S62-57723B), but the problem was still not solved as to providing corrosion resistance to the apparatus as described above and as to the instability of solution.

In addition, it is disclosed that, by heat-treating a PAN solution in dimethylformamide, the PAN is converted to a polymer having a cyclized structure (for example, refer to "Polymer Science (USSR)," (Polym. Sci. USSR), 1968, Vol. 10, page 1537), however, since it is such a dilute solution that the polymer concentration is 0.5% and so low in viscosity as to be substantially difficult in forming or molding into a fiber or the like, and a rise in concentration thereof caused the polymer to be precipitated to make incapable of being used as a solution.

On the other hand, a solution in which PAN is modified with a primary amine is disclosed (for example, refer to "Journal of Polymer Science, Part A: Polymer Chemistry," (J. Polym. Sci. Part A: Polym. Chem.), 1990, Vol. 28, page 1623), but the solution is such as that imparted with hydrophilic property to the PAN itself, which is not made into flame resistant, and totally differs in technical ideas from a solution containing flame resistant polymer.

Further, a technique in which the yield can be improved together with physical properties by converting a flame resistant fiber to a carbon fiber in a specific carbonizing condition is disclosed (for example, refer to Official Gazette of JP Patent No. 2636509), but a compatibility therebetween with an easier method has been demanded.

With regard to a flame resistant polymer soluble in an organic solvent, we made a proposal (Pamphlet of WO 05/080448 A). However, at producing the flame resistant fiber by employing the technique, a more stabilized fiber forming ability, an improvement of physical properties of the obtained flame resistant or carbon fiber, decrease of variation of physical properties between single fibers in those fiber assemblies, or the like have been desired.

Furthermore, the flame resistant fiber obtained by the method described in Pamphlet of WO 05/080448 A, compared to the flame resistant fiber produced by the conventional step of making flame resistant in the air, could not be said that its mechanical strength is necessarily sufficient. The reason is, although it is known that excellent mechanical characteristics are exhibited by arranging orientation of constituent polymer in fiber axis direction, in the case of the method described in Pamphlet of WO 05/080448 A, that the flame resistant polymer as extruded from a spinneret is in a state of no orientation, and on the other hand, it was extremely difficult to make the molecule highly oriented by a drawing in the process since the flame resistant polymer molecule has a rigid structure.

For example, it is the major trend that carbon fibers used as a primary structural material of aircrafts are those in which PAN is used as the starting material. That is because the fiber is excellent in tensile modulus and strength in fiber axis direction, further, since it is also high in compressive strength, the material exhibits a high rigidity and, simultaneously, a defect such as a yield is unlikely to occur when molded into a composite. On the other hand, compared to the PAN-based carbon fiber, pitch-based carbon fiber has characteristics that its tensile modulus is high and its thermal conductivity or electric conductivity is also high, and used as material for panels of artificial satellite, cement reinforcement, parts of printer or copying machine, or the like.

Here, the difference of characteristics of both fibers is based on a difference of aggregate structures of graphene as described above, but the most basic unit of the aggregate structure of grapheme is a crystal. A well known relation between a crystal structure and characteristics is a relation between modulus or compressive strength and a crystal size. In general, in carbon fibers, as crystal size becomes large, modulus increases. This is because the modulus is related to structural regularity and it is understood that, as the crystal size increases and the structural regularity becomes higher, molecular movement by an external stress becomes smaller and the modulus becomes higher. When a fiber is compressed in the fiber axis direction, the maximum shear stress is loaded in direction of 45° to the fiber axis. This shear stress functions to crystal surfaces to slide, but since the force present between the graphenes is the van der Waals force which is very weak, when the crystal is large, a breakage is easy and likely to occur. That is, when crystal is large, a trade-off characteristic that modulus is high but compressive strength is low appears. A solution of the trade-off is a desire for long years in carbon fiber, and a compatibility of the modulus and the compressive strength is a strongly desired problem to be solved.

Furthermore, when electric conductivity or thermal conductivity is to be improved, it is advantageous that the crystal size is large. This is because the crystal transmits electrons in carbon fiber, and it is advantageous to make the crystal, which is the path of the electrons, as large as possible to maintain its continuity. On the other hand, when the crystal size is made large to increase electric conductivity or thermal conductivity, a defect is brought about that the material strength decreases and becomes brittle. That is because, in general, when crystal size is made large, to the extent that molecules are taken into the crystal, the space where the molecules were present becomes a void to generate a structural defect.

As mentioned above, with regard to carbon fiber, there are some problems of trade-off relation which are based on its structure and theoretically difficult to be solved. In order to solve these problems, various efforts have been made for long years. For example, with regard to compatibility between the modulus and the compressive strength of the PAN-based carbon fiber, the following technique is disclosed.

For example, when an acryl-based fiber is subjected to a carbonization treatment, a technique for obtaining a carbon fiber having a high tensile modulus and a high compressive strength by raising the temperature to 2200° C. or more and positively drawing the fiber to prevent its orientation relaxation, is disclosed. However, due to the high heat treatment temperature, the crystal size of the carbon fiber becomes large and the compressive strength is not increased as expected (refer to JP-S63-211326 A).

Further, a technique for decreasing crystal size by an electron beam radiation is disclosed (refer to JP-H4-19219 A). This is a technique for lowering molecular movement by electron beam cross-linking and preventing crystal growth. According to this technique, although the crystal size of the carbon fiber in surface layer of the carbon fiber decreases, since the maximum temperature of the carbonization treatment becomes 2000° C. or more, the crystal size of the carbon fiber as a whole does not decrease, and the improvement of the compressive strength was insufficient.

As the above-mentioned, various methods have been studied to improve carbon fiber characteristics by controlling a draw ratio or the like during heat treatments such as at fiber formation or carbonization treatment. However, in spite of these efforts, a PAN-based carbon fiber of which tensile modulus and compressive strength are compatible in a high level has not been obtained.

In the case of pitch-based carbon fiber which is another representative carbon fiber, the following technique is being studied to improve its weak point which is compressive strength.

For example, a technique of improving compressive strength of carbon fiber by spinning a pitch containing 5 to 40% optically anisotropic phase at an extremely high spinning viscosity (several thousands poises), and this is carbonized (refer to JP-H2-14023 A). A method of improving compressive strength by injecting boron ion under vacuum to a pitch-based carbon fiber is disclosed (refer to JP-H3-816 A).

However, in these techniques, compared to conventional production methods of carbon fiber, an extremely specific process condition or an impractical process means is necessary, and it was difficult to employ them as an industrial pitch-based production method of carbon fiber.

The above-mentioned are techniques relating to improvement of compressive strength, but there are many other problems of long years to be solved and they are too many to be mentioned. Various efforts have been made for both of the PAN-based and the pitch-based carbon fibers and the physical properties have been tried to be improved by process conditions or by improvement of precursor/carbon fiber, but any of them has brought about a substantial improvement.

By the way, we propose a production method completely different from the above-mentioned conventional carbon fiber produced by using the flame resistant fiber obtainable by the air-oxidation, i.e., a production method of carbon fiber of which starting material is an amine-modified flame resistant polymer (refer to Pamphlet of WO 05/080448 A). In the production method of carbon fiber described in the patent reference, there are merits that the production process of the flame resistant polymer which is the starting material is, compared to the production process of the conventional flame resistant fiber, not only low in plant cost, but also excellent in safety and in working environment. However, the flame resistant polymer molecule to be the starting material has a rigid structure, and it is extremely difficult to make this molecule highly oriented, and as a result, it was also difficult to obtain a carbon fiber excellent in mechanical properties.

Thus, it would be advantageous to provide a flame resistant fiber obtainable by fiber forming a flame resistant polymer, to improve fiber forming ability to obtain a flame resistant fiber assembly of a higher performance.

SUMMARY

We provide flame resistant fibers having the following constitution: A flame resistant fiber comprises a flame resistant polymer modified by an amine-based compound as a constituent, wherein a molecular orientation by a wide angle X-ray measurement is 65% or more and a specific gravity is 1.35 or more, or a flame resistant fiber which comprises the flame resistant polymer modified by the amine-based compound as a constituent, wherein a coefficient of variation of cross-section areas of single fiber is 25% or less.

We further provide methods of producing the flame resistant fiber having anyone of the following constitutions. That is:

(1) A production method of a flame resistant fiber, wherein the flame resistant fiber is obtained by subjecting a solution containing a flame resistant polymer modified by an amine-based compound to a wet spinning or a semi-dry spinning in a coagulation bath in such a way that a degree of swelling of the coagulated yarn at the outlet of the coagulation bath is 100 to 1000 wt %.

(2) A production method of a flame resistant fiber, wherein the flame resistant fiber is obtained by, after subjecting a solution containing a flame resistant polymer modified by an amine-based compound to a wet spinning or a semi-dry spinning in a coagulation bath, separately subjecting it to a drying at 50 to 300° C. and a drawing at 200 to 350° C.

Further, the carbon fiber can be produced by carbonizing the above-mentioned flame resistant fiber, and its crystal size Lc and specific gravity ρ satisfy the relation of the following formulas (1) or (2):

$$Lc \leq 3.5 \text{ nm } \rho \geq 1.83 \quad (1)$$

$$Lc > 3.5 \text{ nm } \rho \geq 0.068Lc + 1.592. \quad (2)$$

Accordingly, it is possible to stably produce a high performance flame resistant fiber. It is also possible to carbonize the flame resistant fiber as it is, and it is possible to produce a high performance carbon fiber efficiently.

Further, the structure of the carbon fibers have, compared to conventionally known carbon fibers, a characteristic that the specific gravity is high for the same crystal size. By realizing this structure, it became possible to make a high modulus and a high compressive strength compatible and, furthermore, it also became possible to provide a carbon fiber excellent in fiber strength. In addition, it also became possible to provide a carbon fiber excellent in thermal conductivity or in electric conductivity. Since it has a novel fiber structure which has not been known, it is expected that the fiber exhibits quite novel characteristics other than the above-mentioned.

DETAILED DESCRIPTION

Figure 1:
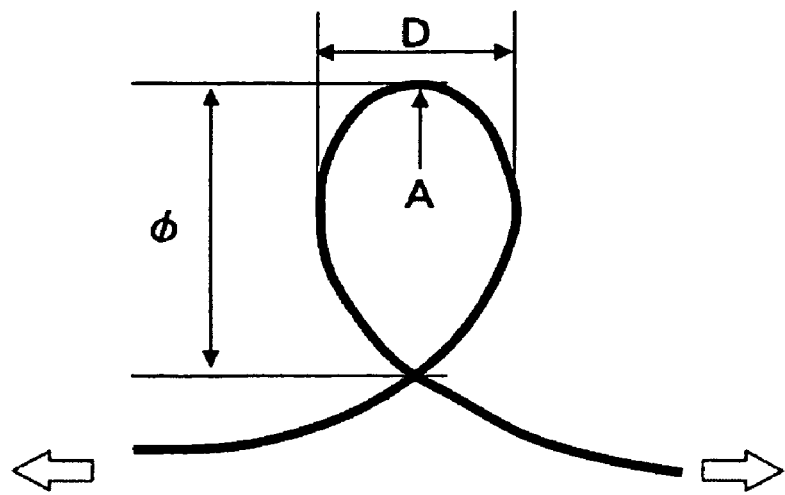
FIG. 1 is a schematic side view for illustrating the method of measurement of the loop compressive strength of carbon fiber.

A flame resistant polymer is a polymer having flame resistance and a solution containing flame resistant polymer is a solution in which a component mainly comprising the flame resistant polymer is dissolved in an organic solvent. The solution is a viscous fluid and may be a solution having a flowability at forming or molding, and includes not only solutions having a flowability at room temperature but also any one having a flowability around processing temperature by heating or by a shear force, even though it is a solid or gel having no flowability at some temperature.

Further, the flame resistance means substantially the same as the term 'fire resistance' and is employed while including the meaning of the term 'flame retardance.' Concretely, the flame resistance is a general term denoting properties of difficulty to continue combustion, namely, difficulty to burn. As a specific means of evaluating the flame resistant performance, for example, in JIS Z 2150 (1966), a fire resistance test method of thin materials (45° Meckel burner method) is described. It can be determined by heating a sample to be evaluated (board, plate, sheet, film, thick fabric or the like having a thickness of less than 5 mm) with a burner for a specific time to evaluate after-flame time, carbonized length, etc. after igniting. A shorter after-flame time or a shorter carbonized length is considered as more excellent flame resistant (fire resistant) performance. In the case of fiber products, a combustion test method of fiber is described in JIS L 1091 (1977). After testing by the method, it can similarly be determined by measuring carbonized area or after-flame time. Shapes and forms of flame resistant polymers or flame resistant formed products are of various kinds and conditions, and the degree of flame resistant property encompasses a wide range from very high flame resistance exhibiting no ignition at all to a certain continuation of combustion after ignition, but those of which flame resistant property are considered to be on a predetermined level or higher by the specific evaluation method described in the examples mentioned later are regarded as the objects. Concretely, it is preferable that the flame resistant property is 'excellent' or 'favorable.' In particular, at a stage of flame resistant polymer, shapes and configurations of the polymers change depending on the conditions of isolation, and as the property of flame resistance, it may include considerable variation, so it is preferable to adopt the method of evaluating after forming into a predetermined shape.

Flame resistant molded products such as flame resistant fibers made by forming the flame resistant polymers can also be measured by the specific means of evaluating flame resistance described in the examples mentioned later.

The flame resistant polymer is the same as or similar to the chemical structure of the so-called flame resistant fiber or stabilized fiber, and a PAN-based polymer heated in the air as a precursor, a pitch raw material based on petroleum or coal which is oxidized, a phenolic resin-based precursor or the like are exemplified. In view of easiness of dissolution, the flame resistant polymer obtained from a PAN-based polymer as a precursor is preferable.

In case of using a PAN-based polymer as a precursor, the structure of the flame resistant polymer is not completely clear, but according to a literature in which a PAN-based polymer was analyzed (Journal of Polymer Science, Part A: Polymer Chemistry Edition, 1986, Vol. 24, page 3101), it is understood to have naphthyridine ring, acridone ring or hydrogenated naphthyridine ring generated by cyclization reaction or oxidation reaction of nitrile groups, and in view of its structure, it is generally called as a ladder polymer. Needless to say, it is no problem unless flame resistance is deteriorated even though unreacted nitrile groups remain, and no problem unless solubility is deteriorated even though a cross-linking is caused by a very small quantity between the molecules.

In the case where 13-C of the flame resistant polymer itself or of a solution thereof is measured by a nuclear magnetic resonance (NMR) apparatus, a structure having signals in 150 to 200 ppm resulting from polymer is preferable. The absorption in the range renders flame resistance favorable.

The molecular weight of the flame resistant polymer is not particularly limited but it may be a molecular weight having a viscosity suitable for its forming method.

Further, as the flame resistant polymer, a flame resistant polymer modified with an amine-based compound is used. As the state 'modified with an amine compound' mentioned here include, for example, a state such that an amine-based compound chemically reacted with a raw material precursor polymer, or a state such that an amine-based compound is taken into the polymer by an interaction such as hydrogen bond or van der Waals force. It is found by the following method whether or not the flame resistant polymer in a solution containing flame resistant polymer is modified with an amine-based compound:

A. A spectroscopic method, for example, a means of analyzing the difference in structure from unmodified polymer by using the above-mentioned NMR spectrum, infrared absorption (IR) spectrum or the like.

B. A means of measuring the weight of the flame resistant polymer in a solution containing the flame resistant polymer by the method mentioned later to confirm whether the weight increased or not with respect to the precursor polymer used as raw materials.

In case of the former, a part originated from the amine compound used as the modifier is added as a new spectrum in the spectrum of the flame resistant polymer modified with the amine compound with respect to the spectrum of a polymer usually obtained by air oxidation (not modified with an amine compound).

In the case of the latter means, usually by an air-oxidation, about the same weight of the flame resistant fiber as the weight of the precursor fiber is generally obtained, but it is preferable that the weight is generally increased by the modification with the amine by 1.1 times or more, furthermore, 1.2 times or more and furthermore, 1.3 times or more. As the upper limit of the amount increased, it is preferable to increase to 3 times or less, furthermore, 2.6 times or less and furthermore, 2.2 times or less. When the weight change is small, the dissolution of a flame resistant polymer may become insufficient, and it is possible that the polymer component is left as a foreign matter when it is made into a flame resistant formed products or a formed carbon products. On the other hand, when the weight change is large, it may deteriorate the flame resistance of polymer.

The flame resistant polymer can be water-insoluble or can be water-soluble. Water-insolubility or water-solubility is related to selection of solvents and the above-mentioned weight change, and it is recognized that, when an amine-based compound is used as a solvent, the higher the degree of weight increase, the higher the tendency to become water-soluble, but the details are not clear.

Further, water-insoluble or water-soluble polymer can properly be selected by objects and applications, but as the heat treatment becomes hard, it more frequently becomes water-insoluble at a later stage of formed products.

The amine-based compound capable of being used for the amine modification for obtaining the flame resistant polymer may be any of compounds having a primary to quaternary amino group, and concretely, ethanol amines such as monoethanol amine (hereunder, abbreviated as MEA), diethanol amine, triethanol amine and N-aminoethyl ethanolamine, polyethylene polyamines such as ethylene diamine, diethylene triamine, triethylene tetramine, tetraethylene pentamine, pentaethylene hexamine and N-aminoethyl piperazine, and o-, m- and p-phenylene diamines, are mentioned.

In particular, other than amino groups, it preferably has a functional group having an element such as oxygen, nitrogen or sulfur such as hydroxyl group, and it is preferable that the compound has two or more functional groups including the amino group and a functional group other than such amine in view of reactivity, etc. These can be used as one kind, or two kinds or more together. In the case of a compound having a functional group other than the amino group, for example, hydroxyl group, it is possible that the hydroxyl group modifies the flame resistant polymer.

The flame resistant polymer can be made into a solution using an organic solvent as its solvent. Regarding a content of the frame resistant polymer, as the lower limit, 2% by weight or more, 10% by weight or more, or 20% by weight or more is preferable in this order, and as the upper limit, 70% by weight or less, 60% by weight or less, or 50% by weight or less is preferable in this order. In the case of a low concentration, the effect is not deteriorated but productivity in molding is occasionally low, and in the case of a high concentration, flowability is so poor as to occasionally cause a difficulty in molding process. The flame resistant polymer concentration is calculated by the following equation:

Flame resistant polymer concentration (wt %)=100× weight of flame resistant polymer/weight of solution containing flame resistant polymer.

The weight of flame resistant polymer is determined by using a thermogravimetric analysis instrument (TG), as the weight of residual solid component when the solution containing flame resistant polymer is heated in nitrogen gas at a rate of 50° C./minute up to 300° C. In the case where the solid polymer can be separated by a proper coagulant (precipitant), the weight of flame resistant polymer can directly be calculated from the weight of coagulated polymer. In the case of a water-insoluble polymer, it can be determined as a weight of solid polymer after the flame resistant polymer-containing solution is poured into water, water-soluble components out of the polymer is sufficiently washed and removed with warm water of 90° C. and dried.

An amine-based organic solvent can be used as the organic solvent. Such a solvent may be any of compounds having a primary to quaternary amine structure. By using such an amine-based organic solvent, a solution containing flame resistant polymer in which the flame resistant polymer is uniformly dissolved is obtained, and a flame resistant polymer having also a favorable moldability is realized.

Further, the flame resistant polymer can also be made into a solution using a polar organic solvent as its solvent. In this solvent, an amine-based compound such as an amine-based organic solvent can be contained. It is because the flame resistant polymer modified with the amine-based compound has a high polarity and the polar organic solvent well dissolves the polymer.

The polar organic solvents are those having a hydroxyl group, amino group, amide group, sulfonyl group, sulfone group or the like, and are well compatible with water, and as examples thereof, ethylene glycol, diethylene glycol, triethylene glycol, polyethylene glycol having a molecular weight of approximately 200 to 1000, dimethyl sulfoxide (hereunder, abbreviated as DMSO), dimethyl formamide, dimethyl acetamide, N-methyl pyrrolidone or the like, or the above described as the amine-based organic solvent, namely, ethanol amines such as MEA, diethanol amine, triethanol amine and N-aminoethyl ethanol amine, polyethylene polyamines such as ethylene diamine, diethylene triamine, triethylene tetramine, tetraethylene pentamine, pentaethylene hexamine and N-aminoethyl piperazine, or o-, m- and p-phenylenediamine or the like, can be used together with an amine modifier. These may be used as only one kind, or as a mixture of two kinds or more.

Above all, dimethyl sulfoxide is preferable in view of being also applicable to wet spinning for the reason that the flame resistant polymer is easily coagulated in water and, further, easily become a dense and rigid polymer.

In the case of an amine-based solvent, the solvent preferably has, other than the amino group, a functional group having an element such as oxygen, nitrogen and sulfur such as hydroxyl group, and it is preferable to be a compound having two or more functional groups including the amino group and a functional group other than such amines, in view of solubility. By making a solution containing flame resistant polymer in which the flame resistant polymer is more uniformly dissolved, it is possible to obtain a flame resistant fiber with less foreign matter.

Further, within a range of not impairing the object, for example, when the flame resistant polymer is water-soluble, it may be made into a uniform solution by using other solvents such as water (for example, water-soluble solvent) in combination with the polar organic solvent. The use of water is preferable in view of relative easiness of removing solvent during at forming mentioned later or of cost. When water is added, as to the amount to be added with respect to 100 parts by weight of the flame resistant polymer, as the lower limit, 5 parts by weight or more, 10 parts by weight or more, or 20 parts by weight or more, and as the upper limit, 300 parts by weight or less, 200 parts by weight or less, or 150 parts by weight or less, is preferable in this order.

Further, in the case of an amine-based solvent, a polar organic solvent such as ethylene glycol, diethylene glycol, triethylene glycol, polyethylene glycol having a molecular weight of approximately 200 to 1000, DMSO, dimethyl formamide, dimethyl acetamide and N-methyl pyrrolidone may be contained as a small amount of other component to be mixed. The use of such a compound together with the amine-based organic solvent is preferable since not only a solution containing the flame resistant polymer can be obtained at a low cost but also it facilitates removal of solvents in the step of spinning step mentioned later.

The viscosity of the solution containing flame resistant polymer can be determined at a preferable range depending on each of forming method, molding method, molding temperature, and kind of spinneret or metal mold when the polymer is used. In general, it can be used at a range of 1 to 100000 Pa·s in a measurement at a temperature of 50° C. More preferably, it is 10 to 10000 Pa·s and more preferably 20 to 1000 Pa·s. Such viscosity can be measured by various kinds of viscometers, for example, a rotary viscometer, a rheometer or a B-type viscometer. It may be in the above-mentioned range by any one of the measuring methods. Even though the viscosity is out of such a range, it can also be used in proper viscosity by heating or cooling when it is spun.

Next, examples of method of manufacturing the flame resistant polymer-containing solution are explained. As examples of method of obtaining the flame resistant polymer-containing solution, the following methods are exemplified:
A. A method of making a precursor polymer flame resistant in a solution.
B. A method of directly dissolving the flame resistant polymer component in a solvent.

In any of the above-mentioned methods, as the precursor polymer as a raw material, for example, an acryl-based polymer, a polymer of which raw material is pitch of which raw material is petroleum or coal, a phenolic resin or the like can be used. Above all, acryl-based polymer is preferable in view of solubility.

As the acryl-based polymer, in view of easy progression of the reaction to make flame resistant and solubility, it is preferable to be PAN which has a structure derived from AN. When the PAN is a copolymer, it is preferable that the PAN comprises the unit derived from AN 85 mol % or more, more preferably 90 mol % or more and still more preferably 92 mol % or more and other copolymer component. Methods of polymerizing such acryl-based polymer are not particularly limited, but a solution polymerization method, a suspension polymerization method, a slurry polymerization method, an emulsion polymerization method or the like can be applied.

As concrete examples of the copolymer components, allyl sulfonic acid metal salt, methallyl sulfonic acid metal salt, acrylic acid ester, methacrylic acid ester and acryl amide or the like can be copolymerized. Other than the above-mentioned copolymer components, as components for promoting to make flame resistant, compounds containing a vinyl group, concretely, acrylic acid, methacrylic acid, itaconic acid or the like can be copolymerized and a part or all of these may be neutralized with an alkaline component such as ammonia. The number average molecular weight of the acryl-based polymer can arbitrarily be selected from approximately 1000 to 1000000. The number average molecular weight can be determined from a measurement of intrinsic viscosity or the like of a diluted solution.

In the case where the precursor polymer is dissolved in a polar organic solvent, shapes and forms of the precursor polymer may be any of powdery, flake-like or fibrous, and a polymer waste or a yarn waste produced during polymerization or spinning can also be used as a recycling raw material. It is preferable to be powdery, in particular, fine particulates of 100 μm or less, in view of solubility in a solvent. A polymer solution, obtained by dissolving beforehand in a solvent at a stage of monomer and polymerizing by a proper polymerization method, can also be used as it is.

In the case where the flame resistant polymer is directly dissolved in a polar organic solvent, as the polymer, the above-mentioned precursor polymer oxidized under oxygen atmosphere at a proper temperature, for example, 200 to 300° C., can be used. With regard to such a polymer of which flame resistance is well promoted, its shape is not particularly limited and may be fibrous, particulate, powdery or porous. As such a flame resistant polymer, a precursor polymer made into the above-mentioned shape beforehand may be made flame resistant, for example, a precursor polymer like a filament may be made flame resistant and thereafter subjected to a cutting or processing or the like into a proper shape. Commercialized flame resistant products may also be used, and wastes produced during manufacturing such flame resistant products may also be used. According to such methods, it becomes possible to produce flame resistant products by recycling once produced flame resistant fiber wastes.

Even in the case where the precursor polymer is dissolved in an amine-based solvent or in a polar organic solvent in the presence of an amine-based compound, or even in the case where the flame resistant polymer is dissolved in an amine-based solvent or in a polar organic solvent in the presence of an amine-based compound, the dissolution may be performed under normal pressure, or, as the case may be, may also be performed under an increased pressure or under a decreased pressure. As apparatuses used for the dissolving, other than ordinary reaction vessels equipped with a stirrer, mixers such as extruders or kneaders can be used singly or in combination.

In this case, the dissolution is preferably performed by using 100 to 1900 parts by weight, more preferably 150 to 1500 parts by weight of the amine-based solvent or of the total of the amine-based compound and the polar organic solvent with respect to 100 parts by weight of acryl-based polymer.

In the case where the precursor polymer is dissolved in an amine-based solvent or in a polar organic solvent in the presence of an amine-based compound and thereafter made flame resistant, it is preferable that an oxidizing agent is used for sufficiently making flame resistant. To further improve the degree of flame resistance of a polymer of which flame resistance is promoted, an oxidizing agent can be used. As such oxidizing agents, organic or inorganic oxidizing agents can be used. Above all, it is preferable to add air in view of handling and cost. To make flame resistant and to dissolve in liquid uniformly in a liquid phase, it is preferable to use an oxidizing agent which can be easily mixed into the solvent system. Concretely, nitro-based, nitroxide-based and quinone-based oxidizing agents are mentioned. Above all, as particularly preferred, aromatic nitro compounds such as nitrobenzene, o-, m-, p-nitrotoluene, nitroxylene, o-, m-, p-nitrophenol, o-, m-, p-nitrobenzoic acid, can be mentioned. The amount to be added of these oxidizing agents is not particularly limited, but it is preferable to be 0.01 to 100 parts by weight, more preferably 1 to 80 parts by weight and still more preferably 3 to 60 parts by weight with respect to 100 parts by weight of the precursor polymer. By controlling to such compounding ratio, it becomes easy to control the concentration of finally obtained solution containing the flame resistant polymer in the above-mentioned preferable range.

In the case where the precursor polymer is dissolved in an amine-based solvent or in the polar organic solvent in the presence of the amine-based compound and thereafter made flame resistant, the amine-based solvent and the oxidizing agent, or the amine-based compound, the polar organic solvent and the oxidizing agent may be mixed before adding the precursor polymer or may be mixed simultaneously with the precursor polymer. It is preferable that the precursor polymer, the amine-based compound and the polar organic solvent are mixed beforehand and are heated to be dissolved, and then the oxidizing agents are added thereto to obtain a flame resistant polymer, in view of producing less insoluble matter. Needless to say, a component other than the precursor polymer, the oxidizing agent, the amine-based compound and the polar organic solvent is not prevented from being mixed into the solution.

The mixed solution of the precursor polymer, the amine-based compound and the polar organic solvent and the like is heated to a proper temperature to thereby promote the precursor polymer to be dissolved and made flame resistant. At this point, it is preferable that the temperature is 100 to 350° C., more preferably 110 to 300° C. and still more preferably 120 to 250° C., although it depends on a solvent and oxidizing agent to be used. Needless to say, even in the case where a precursor polymer of which flame resistance is promoted is dissolved, further flame-resistance may be promoted by heating.

It is preferable that there is no unreacted matter, insoluble matter or gel in the solution containing flame resistant polymer obtained by the above-mentioned method, but it can remain in a very small amount. Depending on the cases, it is preferable that the unreacted matter or insoluble matter is filtered/dispersed by using a sintered filter or the like before making the solution into a fiber.

An inorganic particle such as silica, alumina or zeolite, a pigment such as carbon black, a defoaming agent such as silicone, a stabilizer/flame retardant such as phosphorus compound, various kinds of surfactants, and other additives may be contained in the solution containing flame resistant polymer. Inorganic compounds such as lithium chloride and calcium chloride can be included for the purpose of improving solubility of the flame resistant polymer. These may be added before promoting to make flame resistant or after promoting to make flame resistant.

Further, in the case where ethylene glycol, diethylene glycol, triethylene glycol, polyethylene glycol, DMSO, dimethyl formamide, dimethyl acetamide or the like, which is the above-mentioned polar compound, is contained, these compounds may be added to the amine-based organic solvent or be contained in the precursor polymer.

Depending on a viscosity, polymer concentration, degree of making flame resistant and kind of solvent or the like of the solution containing flame resistant polymer finally obtained, it can properly be adjusted to the above-mentioned preferable range.

Next, the flame resistant fiber in which the flame resistant polymer is employed is explained. The flame resistant fiber is composed of the flame resistant polymer modified with the amine compound in a part or in the whole. In general, single fibers of the flame resistant fiber aggregate to form an assembly such as a fiber bundle.

In the first embodiment of the flame resistant fiber, a coefficient of variation of cross-sectional area of single fiber in the assembly is 25% or less, preferably 25% or less, more preferably 20% or less. That is, by decreasing the coefficient of variation of cross-sectional area of single fiber, i.e., by decreasing the fluctuation of cross-sectional area of single fiber, the flame resistant fiber is improved in drawing property in a carbonization treatment step and, since drawing in a higher ratio becomes possible, it becomes possible to obtain a carbon fiber having high physical properties. The coefficient of variation of cross-sectional area of a single fiber can be determined by the following way. That is, single fibers constituting an assembly are paralleled as to be a bundle, and they are embedded with a resin. Its cut section is observed by a microscope and a photo shot at 1000 times magnification is taken. In the case where the total number of the single fibers is around 500 fibers, all of them, and even in case of 1000 fibers or more, at least 20% fibers are sampled, the cross-sectional area of each single fiber is measured by, for example, using an image analysis, and the coefficient of variation is determined by calculation. The coefficient of variation in the population is defined as standard deviation/average value×100(%).

In the first embodiment of the flame resistant fiber, it is preferable that its specific gravity is 1.1 to 1.6, 1.15 to 1.55 is more preferable and 1.2 to 1.5 is still more preferable. When the specific gravity is too small, there are many voids inside of the single fiber and fiber strength may decrease, on the other hand, when it is too large, the denseness becomes too high and its elongation at break may decrease too much. The specific gravity can be determined by utilizing the immersion method or the sink-float method according to JIS Z 8807 (1976).

On the other hand, in the second embodiment of the flame resistant fiber, it is necessary that the molecular orientation by wide angle X-ray measurement is 65% or more, preferably 70% or more, more preferably 72%, and the specific gravity of the flame resistant fiber is 1.35 or more. By making the degree of molecular orientation 65% or more, it is possible to make the flame resistant fiber excellent in mechanical characteristics and highly resistant to the environment. The higher the degree of molecular orientation, the more preferable, but when a degree of orientation of 85% or more is tried, a yarn breakage or a fluff generation may occur. The specific gravity of the flame resistant fiber varies depending on its molecular weight or a residual amount of nitrites of the flame resistant polymer which constitutes the flame resistant fiber, but if it is less than 1.35, its resistance to the environment is insufficient. It is more preferably 1.40 or more, still more preferably 1.43 or more, and the higher the more preferable, but it is difficult to obtain a flame resistant fiber of more than 1.60.

Of course, it is more preferable that the flame resistant fiber has both characteristics of the above-mentioned first embodiment and the second embodiment.

As stated later, the flame resistant fiber can be obtained through a spinning step of the above-mentioned solution containing flame resistant polymer and a solvent removing step.

The flame resistant fiber may be filamentary or a staple fiber. When it is filamentary, it is appropriate such as for using as a raw material of carbon fiber by paralleling as it is, and when it is a staple fiber, it is appropriate, for example, as a crimped fiber, for using as a fabric such as a woven fabric, a knitted fabric, a non-woven fabric or the like.

Further, when it is made into a bundle of fibers, the number of single fibers in the bundle is properly determined by purpose of use, but it preferably is 50 to 100000 fibers/bundle, more preferably 100 to 80000 fibers/bundle and still more preferably 200 to 60000 fibers/bundle, in view of later stage processability.

Further, the thickness of each single fiber is, in the case of being used as a raw material of carbon fiber, preferably 0.00001 to 100 dtex, more preferably 0.01 to 100 dtex. On the other hand, it is preferably 0.1 to 100 dtex, more preferably 0.3 to 50 dtex in the case of being processed into fabric. The diameter of single fiber is preferably 1 nm to 100 μm, more preferably 10 nm to 50 μm in the case of being used as raw materials of carbon fiber. On the other hand, it is preferably 5 to 100 μm, more preferably 7 to 50 μm in the case of being processed into fabric.

Further, the cross-sectional shape of each single fiber may be circle, ellipse, cocoon type or indefinite shape depending on the cases.

Further, in the flame resistant fiber, it is preferable that the tensile strength of single fiber is 0.1 to 10 g/dtex, more preferably 0.2 to 9 g/dtex and still more preferably 0.3 to 8 g/dtex. The tensile strength can be measured by using an all purpose tensile tester (for example, Model 1125 manufactured by Instron Corporation) in conformity to JIS L1015 (1981).

Further, the residual amount of solvent component contained in the flame resistant fiber is preferably 10% by weight or less, more preferably 5% by weight or less and still more preferably 1% by weight or less. If the residual amount of solvent is too large, the flame resistance may deteriorate.

Next, a production method of the flame resistant fiber for obtaining the flame resistant fiber is explained.

As methods for spinning the solution containing flame resistant polymer into a fibrous state, a wet spinning method or a semi-dry spinning method is employed to increase process productivity.

The spinning can be carried out by making the above-mentioned flame resistant polymer solution as the spinning solution, raising pressure by a booster pump or the like through a pipe, metering and extruding by a gear pump or the like, and casting from a spinneret. As the material of the spinneret, SUS, gold, platinum or the like can appropriately be used.

Further, before the flame resistant polymer solution flows into the spinneret holes, it is preferable to filter or disperse the flame resistant polymer solution by using a sintered filter of the above-mentioned inorganic fiber or a synthetic fiber, for example, by using a woven fabric, knitted fabric, non-woven fabric or the like made of polyester or polyamide as a filter, to decrease a variation of cross-section areas of single fiber of the obtained flame resistant fiber assembly.

Arbitrary values of, as a hole diameter of the spinneret, 0.01 to 0.5 mmφ, as a hole length 0.01 to 1 mm, can be employed. As the number of holes of the spinneret, an arbitrary number from 10 up to 1000000 can be employed. As the hole arrangement, an arbitrary one such as zigzag array can be employed, and holes can be separated as groups so that fibers can be separated.

From the spinneret, a spinning solution is casted directly or indirectly into a coagulation bath to obtain a coagulated yarn. It is preferable that the liquid of the coagulation bath is constituted with the solvent used as the spinning solution and a coagulation accelerating component in view of easiness and simplicity, and using water as the coagulation accelerating component is more preferable. If a water-insoluble substance is selected as the flame resistant polymer, the water can be used as the coagulation accelerating component. The ratio of the solvent for spinning and the coagulation accelerating component in the coagulation bath and a liquid temperature of the coagulation bath are properly selected in consideration of denseness, surface smoothness, spinnability, etc., of the coagulated yarn to be obtained, but especially, as the coagulation bath concentration, it can be an arbitrary range of solvent/water=0/100 to 95/5, but 30/70 to 70/30 is preferable and 40/60 to 60/40 is especially preferable. The temperature of the coagulation bath can be an arbitrary temperature in 0 to 100° C. As the coagulation bath, in the case of an alcohol of which compatibility with water is decreased such as propanol or butanol, it can be used as a 100% bath.

In the first embodiment of the production method of the flame resistant fiber, it is necessary to make a degree of swelling of the obtained coagulated yarn to 100 to 1000 wt %, preferably 200 to 900% and still more preferably 300 to 800%. Being the degree of swelling of the coagulated yarn in these ranges greatly relates to the toughness and flexibility of the coagulated yarn and has an influence on spinnability. The degree of swelling is determined in view of spinnability and has an influence on drawing property in bath in later steps, but if it is in these range, the coefficient of variation of cross-section areas of single fiber can be made small in the obtained flame resistant fiber. In such a degree of swelling, the coagulated yarn is usually amorphous. Whether it is amorphous or not can be determined by a wide angle X-ray diffractometry. Furthermore, the degree of swelling of the coagulated yarn can be controlled by an affinity between the flame resistant polymer which constitutes the coagulated yarn and the coagulation bath, the temperature of the coagulation bath or the concentration of the coagulation bath and, by making the temperature of the coagulation bath or the concentration of the coagulation bath into the above-mentioned range to the specified flame resistant polymer, it is possible to make into the degree of swelling of the above-mentioned range.

Next, the coagulated yarn should be drawn in a drawing bath or washed in a water washing bath. Of course, it may be drawn in the drawing bath while being washed with water in the water washing bath. The draw ratio should be 1.05 to 5 times, preferably 1.1 to 3 times and more preferably 1.15 to 2.5 times. In the drawing bath, warm water or a solvent/water is used, the drawing bath concentration as the solvent/water can be an arbitrary range in 0/100 to 70/30. In addition, as the water washing bath, usually warm water is used and the temperatures of the drawing bath and the water washing bath are preferably 50 to 100° C., more preferably 60 to 95° C. and especially preferably 65 to 85° C.

After completing the coagulation, the fiber is dried and, if necessary, drawn to become a flame resistant fiber.

As the drying methods, directly contacting the fiber with a plural of dried and heated rollers, blowing hot air or steam, irradiation with infrared rays or high-frequency electromagnetic waves, reducing pressure or the like, can be properly selected and combined. In the case where a hot air is blown, the blowing can be a parallel flow or a cross flow to the fiber traveling direction. As infrared rays of radiation heating type, far infrared rays, mid-infrared rays and near infrared rays can be employed and an irradiation with microwaves can also be selected. The drying temperature can be arbitrarily selected in the range around 50 to 450° C. but, in general, it is possible to dry, in the case of a low temperature, in a long time, and in the case of a high temperature, in a short time.

When the fiber is drawn after drying, the specific gravity of the fiber after drying is, generally, 1.15 to 1.5, preferably 1.2 to 1.4 and more preferably 1.2 to 1.35. The coefficient of variation of cross-section areas of single fiber of fiber assembly after drying is, preferably 5 to 30%, more preferably 7 to 28% and still more preferably 10 to 25%. It is preferable that the elongation at break of single fiber in the fiber assembly after drying is 0.5 to 20%. With regard to the fiber assembly after drying, it is preferable that the exothermic energy of oxidation (J/g) determined by a differential scanning calorimeter analysis (DSC) is 50 to 400. As the case may be, a batch-wise drying, not a continuous drying, can also be carried out.

In the production method, the coagulated yarn obtained by spinning the above-mentioned solution containing flame resistant polymer, preferably after passing the above-mentioned drying step or the like, is subjected to a hot drawing in presence of water. By passing such a step, the above-mentioned flame resistant fiber of which degree of molecular orientation by wide angle X-ray is 65% or more and the specific gravity is 1.35 or more can be obtained.

For such a drawing step, it is preferable to employ methods of heating in a state in which the fiber contains water, such as a drawing in a bath in which warm water or hot water is used, or a drawing in which steam is used, subjecting to a hot drawing by a dry heat device or rolls after imparting water beforehand to the fiber, or the like, and the hot drawing by the steam drawing is especially preferable. This is based on a discovery that the amine-modified flame resistant polymer used for producing the flame resistant fiber is significantly plasticized with water. In general, it is difficult to make oriented by drawing a fiber consisting of a molecule having a rigid chemical structure like the flame resistant polymer. This is because a polymer having a rigid molecular chain generally has a high melting point or a glass transition point and it may decompose without being plasticized when only its temperature is raised. To make such a rigid polymer being oriented, special ideas are necessary, for example, such that, in para-type aramids or the like, polymers are oriented in spinneret by controlling them into liquid crystal states. However, we discovered as a result of great efforts, the amine-modified flame resistant fiber is capable of being drawn under a specified condition of water content and temperature. It has been known that a flame resistant fiber obtained by a gas phase oxidation reaction generally contains water of 5% or more, but its drawing is impossible since cross-links are formed between molecules due to a random oxidation reaction by oxygen. On the other hand, the amine-modified polymer is estimated to have no cross-link between molecules, and it is expected that the molecules would be plasticized when interactions between molecules are disconnected. Accordingly, by the characteristics that, subjecting the above-mentioned solution containing flame resistant polymer to a wet or semi-dry spinning, a drawing with water becomes possible for the first time, and it becomes possible to obtain a flame resistant fiber of a high density and a high degree of orientation.

In the case where a drawing in bath is employed, the temperature is preferably 70° C. or more, more preferably 80° C. or more and it is still more preferable to draw at 90° C. or more. At this stage, the fiber structure has already densified, and there is no fear of generating macrovoids even if the temperature is raised, and it is preferable to draw at as high temperature as possible since the effect of molecular orientation becomes high. It is preferable to use water in the bath, but adding a solvent or other compound may be allowed to further improve the drawing property.

It is preferable that the drawing temperature is high, but 100° C. is basically the upper limit of the drawing in bath. For that reason, a drawing in which steam is used is more preferably employed. It is preferable that the temperature is higher, but when a saturated steam is used, since internal pressure of the apparatus is high, the fiber may be damaged by an ejection of the steam. For the purpose of obtaining a flame resistant fiber having a degree of orientation of 65% or more, a saturated steam of 100° C. or more and 150° C. or less may be used. When the temperature exceeds 150° C., the plasticizing effect gradually reaches the ceiling, and the fiber damage due to the steam ejection becomes rather serious. As a drawing treatment apparatus in which saturated steam is used, an apparatus so devised as to be provided with a plural of orifices at fiber inlets and outlets to pressure the inside of the treatment apparatus is preferably used.

It is possible to use a super-heated normal pressure high temperature steam to prevent a fiber damaged by the steam ejection. It becomes possible by heating normal pressure steam by an electric heating, steam, induction heating or the like and then introducing it in the drawing treatment apparatus. As that temperature, 100° C. or more and 170° C. or less is possible, but 110° C. or more and 150° C. or less is preferable. When the temperature is too high, water contained in the steam decreases, and it becomes difficult to achieve the effect of plasticizing of the fiber.

As the draw ratio in bath and the draw ratio by steam, 1.5 times or more is preferable and 2.0 times or more is more preferable. To accelerate molecular orientation, draw ratio is preferable to be higher, but there is specifically no upper limit. However, in view of limitations on fiber forming stability, it is impossible to exceed around 6 times in most cases.

Further, the basic concept is present in using plasticizing effect by water component to the flame resistant fiber, and its method is not limited to the drawing in bath or to the steam drawing. For example, it is possible to draw by heat by a dry heat furnace or a hot roller after imparting water component.

It is possible to use a non-contact type drawing machine in which a dry heat furnace is used, or further, also a contact type drawing machine in which a contact plate or a hot roller is used. However, in the case of the contact type drawing machine, evaporation of water component is rapid, and it is likely that the fiber is mechanically rubbed at the point where the drawing starts. In the case of a non-contact type drawing machine, a temperature of 250° C. or more is needed and, as the case may be, a decomposition of the polymer starts. When the non-contact type drawing machine or the contact type drawing machine is used, the drawing effect is low, and it is more difficult to obtain a high orientation flame resistant fiber than a drawing method in which water component is used. For these reasons, employing a drawing in bath or a steam drawing is preferable.

The drawn fiber thus drawn is preferably dried again, if necessary. The water content of the fiber is preferably 10% or less and more preferably 5% or less. As this drying method, directly contacting the fiber to a plurality of dried and heated rollers or hot plates, blowing a heated air or steam, irradiation with infrared rays or high-frequency electromagnetic rays, reducing pressure or the like can be properly selected and combined, but in order to dry efficiently, it is preferable to dry by rollers. There is no limitation as to the number of rollers.

As to the temperature of the rollers, 100° C. or more and 300° C. or less is preferable and 150° C. or more and 200° C. or less is more preferable. In this step, if drying is insufficient, it may cause a fiber breakage when a tension is loaded to the fiber in a later heat treatment step.

It is preferable that the dried drawn yarn is further provided to, as required, a heat treatment step. The flame resistant polymer has few inter-molecular cross-links and, when a fiber in which this polymer is only spun, dried and drawn is used, depending on their conditions, an orientation relaxation may occur when the final product is exposed to a high temperature or a chemical. To prevent this, it is preferable to provide cross-links by a chemical reaction after the drawing step. There is no limitation to the heat treatment method, and directly contacting the fiber with a plurality of hot rollers or hot plates, blowing hot air or steam, irradiation with infrared rays or high-frequency electromagnetic waves, reducing pressure or the like can be properly selected and combined, but to control the chemical reaction or to suppress a variation of fiber structures, it is preferable to use a dry heat device. The temperature or treating length is properly selected depending on the degree of oxidation of the flame resistant polymer used, the degree of orientation of the fiber and the required characteristics of the final product, but it is preferable that the treating temperature is 200° C. or more and 400° C. or less. A shorter treating time is more preferable since production efficiency becomes high, but when the temperature is raised for that reason, since a structural difference in cross section becomes likely to occur, the temperature is properly controlled depending on required characteristics of the product. The treating time can be an arbitrary value in 0.01 to 60 minutes. It is preferable to draw the fiber when subjecting to a heat treatment. By subjecting to a drawing, molecular orientation can further be increased. It is preferable that the draw ratio is 1.05 to 4.times. The draw ratio is decided from the strength or thickness of the flame resistant fiber required and the processability and the heat treating temperature.

It is preferable that thus obtained fiber does not start to burn when it is contacted with a flame, and it is preferable that its LOI (lowest oxygen index) is 40 or more. Furthermore, the flame resistant fiber has a high orientation/high density, is high in mechanical characteristics and is high in resistance to the environment such as chemicals or heat. In the case where it is drawn after drying, the drawing temperature is 200 to 400° C., preferably 200 to 350° C. and the draw ratio is 1.1 to 4 times, preferably 1.2 to 3 times and more preferably 1.3 to 2.5. The draw ratio is determined from the strength or thickness of the flame resistant fiber required. At the drawing, it is also important to heat treat and, depending on its temperature, an arbitrary value in 0.01 to 15 minutes can be selected as the heat treating time. The drawing and the heat treatment can be carried out simultaneously or separately.

It is preferable that the residual ratio of acrylic group of the fiber after drying is 10% or more and 50% or less. The residual ratio of acrylic group mentioned here is a ratio of acrylic group which is not oxidized by oxidation reaction in the flame resistant polymer molecule constituting the fiber. As a concrete evaluation method, an infrared spectroscopy can be used. 2 mg fiber sample finely crushed by freeze crushing or the like is weighed and further crushed and mixed in a mortar or the like with 300 mg KBr. This is pelletized under a reducing pressure and its infrared spectrum is taken. A peak appears around 2240 $cm^{-1}$ is the peak of acrylic group, and this peak area is measured. On the other hand, in the same way, an infrared spectrum of PAN is taken and a peak area appeared around 2240 $cm^{-1}$ is measured. The peak area of the sample measured is divided by the peak area of PAN and multiplied by 100 is defined as the residual ratio of acrylic group. By being the residual ratio of acrylic group 10% or more, a molecular flexibility is maintained and a smooth drawing becomes possible. A more preferable residual ratio of acrylic group is 20% or more and more preferably 25% or more. It is preferable that the residual ratio of acrylic group is 50% or less. If the acrylic group remains more, a heat treatment step of a later stage becomes a treatment of a high temperature or a long time, and plant cost becomes high. A more preferable residual ratio of acrylic group is 40% or less, more preferably 35% or less.

In the second embodiment of the production method of the flame resistant fiber, even when the degree of swelling of the obtained coagulated yarn is not made into the above-mentioned specified range, in the case where it is drawn after drying, by separately carrying out drying at 50 to 300° C. and drawing at 200 to 350° C. as separate steps, the above-mentioned flame resistant fiber can be made. As a matter of course, the production method of the flame resistant fiber becomes more preferable one if it has the both characteristics of the above-mentioned first embodiment and the second embodiment.

It is possible to properly impart oil agent components to the coagulated fiber or to the fiber after water washing and drawing which is in a swelled state with water, depending on the requirement in the later processing steps. In the case where an oil agent component is imparted, the oil agent concentration is generally made into 0.01 to 20 wt %. As its imparting method, it may be properly selected to apply in consideration of being able to impart uniformly even into inside of the yarn, but concretely, an immersion of the yarn into an oil agent bath, a spray and dropping to a traveling yarn or the like is employed. The oil agent is, for example, that comprising a main oil agent component such as silicone and a diluent component which dilutes the main component, and the oil agent concentration is the containing ratio of the main oil agent component to the whole oil agent. The kind of the oil agent component is not especially limited, but a polyether-based or a polyester surfactant, a silicone, an amino-modified silicone, an epoxy-modified silicone, a polyether-modified silicone can be imparted singly, or as a combination, and other oil agent components may also be imparted.

An imparted amount of such an oil agent component is obtained as the ratio of pure component to dried weight of the fiber, and 0.1 to 5 wt % is preferable, 0.3 to 3 wt % is more preferable and 0.5 to 2 wt % is still more preferable. If the imparted amount of the oil agent component is too small, cohesion of single fibers with each other is generated, and a tensile strength of the obtained carbon fiber may decrease and, if it is too large, the effect may become unlikely to be achieved.

In the case where the flame resistant fiber is in a bundle state comprising a plurality of single fibers, the number of single fibers contained in the bundle can be properly selected according to its purpose for use, but for making into the above-mentioned preferable number, it can be controlled by number of holes of spinneret, or a plurality of the flame resistant fibers may be paralleled.

Further, for making the single fiber thickness into the above-mentioned preferable range, it can be controlled by selecting hole size of spinneret, or by properly determining output from the spinneret.

Further, for making the thickness of single fiber large, an extension of the drying time or raising the drying temperature is preferable in view of decreasing the residual solvent. For obtaining a fibrous flame resistant formed article of a smaller single fiber thickness, it is preferable to employ an electronic spinning method or the like. By such a method, a fiber thickness of a nano-fiber level such as preferably a diameter of 100 nm or less, more preferably 1 to 100 nm, still more preferably 5 to 50 nm can be achieved.

Further, the cross-sectional shape of the single fiber can be controlled by the hole shape for extruding of the spinneret to such as circular hole, eclipse hole, slit, etc., or by the conditions of the solvent removal.

It is possible to obtain a carbon fiber by subjecting the flame resistant fiber to a high temperature heat treatment in an inert atmosphere, so-called "carbonization" treatment. As concrete methods for obtaining the carbon fiber, it can be obtained by subjecting the above-mentioned flame resistant fiber to a treatment in a temperature in the range of, in an inert atmosphere, a maximum temperature of 300° C. or more and less than 2000° C. More preferably, as the lower limit of the maximum temperature, 800° C. or more, 1000° C. or more and 1200° C. or more are preferable in this order, and as the upper limit of the maximum temperature, 1800° C. or less is also employable. By further heating such a carbon fiber, in an inert atmosphere, at 2000 to 3000° C., a carbon fiber in which graphite structure is grown can be made.

In such a carbon fiber, as its tensile strength, 100 MPa or more, 200 MPa or more and 300 MPa or more are preferable, more concretely, it is preferably 1000 MPa or more, more preferably 2000 MPa or more and still more preferably 3000 MPa or more. As upper limit of the tensile strength, 10000 MPa or less, 8000 MPa or less and 6000 MPa or less are appropriate in this order. If the tensile strength is too low, it may not be used as a reinforcing fiber. It is more preferable that the tensile strength is as high as possible, but if it becomes to 1000 MPa, it is sufficient for the purpose in most cases.

As to the carbon fiber, in general, the specific gravity is 1.3 to 2.4, preferably 1.6 to 2.1 and more preferably 1.6 to 1.8. If such a specific gravity is less than 1.3, the fiber is likely to be broken in some cases, and if it exceeds 2.4, a defect is likely to be generated on the contrary.

In the obtained carbon fiber, by satisfying the relation of the following equation of (1) or (2) by the crystal size Lc and the specific gravity p, the effect such as mentioned later is obtained:

$$Lc \leq 3.5 \text{ nm } \rho \geq 1.83 \quad (1)$$

$$Lc > 3.5 \text{ nm } \rho \geq 0.068 Lc + 1.592. \quad (2)$$

The structure of the carbon fiber has a characteristic that its specific gravity is high compared to conventionally known carbon fiber, even in the same crystal size. That is, the crystal constituted with the aggregated structure of grapheme is small and there are many of them. By realizing this structure, a carbon fiber excellent in mechanical properties such as fiber strength, modulus, compressive strength, in thermal conductivity and in electric conductivity was obtained. It is understood that the improvement of the compressive strength is based on suppression of crystal size, and the high modulus was realized by increasing number of crystals and suppressing the molecular movement.

That is, among the carbon fiber, the carbon fiber which satisfies the above-mentioned equation (1), can realize improvements of product performance by being made into high modulus, in the field in which severe requirements regarding compressive strength are made. Usually, in the case where crystal size is small, it is difficult to improve modulus, but in the case of carbon fiber, since the specific gravity is high and the number of crystals is large, it is possible to provide a product of which modulus is higher than that of conventional one. Mechanical properties of composite in which carbon fibers are preferably used is mostly determined by modulus of carbon fiber, and it becomes possible by using the carbon fiber to realize a high performance of all composites. It is especially preferable for aircraft materials, sporting applications such as golf shafts or fishing rods.

Crystal size Lc, which is the crystal thickness corresponding to 002 plane, can be determined by a wide angle X-ray measurement. That is, an X-ray diffraction by CuKα-ray as an X-ray source is carried out to a carbon fiber, and as for a spectrum obtained by scanning in equatorial direction, the crystal size is determined by analyzing the diffraction peak that appears in the vicinity of diffusion angle 2θ=25° of the (002) plane. At first, the background diffusion is deducted from the obtained spectrum and the 002 diffraction peak is fitted to the Gauss function. Next, the half-band width β (radian) of Gauss function is determined and the crystal size is determined by applying the Debye-Scherrer equation:

$$Lc = 0.9 \times \lambda / (\beta \times \cos \theta).$$

λ is the wavelength of X-ray (0.154 nm), θ is a half of the diffusion angle 2θ.

In the case where the carbon fiber satisfies the above-mentioned equation, the crystal size Lc is 3.5 nm or less. The crystal size has especially no lower limit, but preferably it is 3.0 nm or less, more preferably 2.5 nm or less and still more preferably 2.0 nm or less. The smaller the crystal size, the more improvement of the compressive strength is expected, and therefore it is preferable, but if the crystal size is as small as around 1.5 nm, it is sufficient for the purpose in most cases. When the crystal size is smaller that that, the perfectness of the crystal itself may be lost, and compressive strength or modulus of the carbon fiber may decrease on the contrary.

A carbon fiber of which crystal size Lc is 3.5 nm or less has, simultaneously, a specific gravity ρ of 1.83 or more, preferably 1.85 or more, more preferably 1.88 or more and still more preferably 1.90 or more. The specific gravity can be measured by employing a liquid immersion method or sink-float method according to JIS Z 8807 (1976). If the specific gravity is less than 1.83, desired modulus is not exhibited and it may not be suitable for a reinforcing fiber for various composite material. The higher the specific gravity, the more preferable in view of improvement of modulus, but if it is as high as around 2.00, it may be sufficient for the purpose. If the specific gravity is higher than that, its physical characteristic may deteriorate on the contrary.

On the other hand, a carbon fiber which satisfies the above-mentioned equation (2) is that of which crystal size Lc exceeds 3.5 nm. The carbon fiber of which crystal size is large is excellent in electric conductivity or thermal conductivity. This is because the crystal size which transmits electrons in the carbon fiber is large, a continuity of the electron pass way is kept. A carbon fiber of which Lc exceeds 3.5 nm is, simultaneously, that of which specific gravity p satisfies the relation, $\rho \geq 0.068 Lc + 1.592$. By satisfying that equation, it is possible to maintain the strength characteristics of material simultaneously with the electric conductivity or the thermal conductivity, and it becomes possible to suitably use for various fiber products for reinforcing, electric conductive fibers or heat-releasing fibers. When the specific gravity satisfies ρ<0.068 Lc+1.592, it may have a structural defect inside the fiber, and a strength necessary for such applications may not be obtained. The higher the specific gravity, the better in view of fiber strength, and preferably $\rho \geq 0.068$ Lc+1.612, more preferably $\rho \geq 0.068$ Lc+1.642, still more preferably, $\rho \geq 0.068$ Lc+1.662, but if it is as high as around ρ=0.068

Lc+1.682, it is sufficient for the purpose in most cases. If it is higher than that, the physical characteristics of the carbon fiber may deteriorate.

Lc has no upper limit especially, but 100 nm or less is preferable, 70 nm is more preferable and 50 nm is still more preferable. If the crystal size is too large, compressive strength decreases and the fiber becomes difficult to be handled, and when the fiber is used in Lc of 100 nm or less, electric conductivity or thermal conductivity is also sufficient in most cases.

Further, it is good that, for the carbon fiber, single fiber diameter is 1 nm to $7 \times 10^4$ nm, preferably 10 to $5 \times 10^4$ nm and more preferably 50 to $10^4$ nm. If the single fiber thickness is less than 1 nm, the fiber may be easy to be broken, and if it exceeds $7 \times 10^4$ nm, there is an inclination that a defect may likely to generate. Single fibers of the carbon fiber may contain a hollow portion. In such a case, the hollow portion may be continuous or discontinuous.

The obtained carbon fiber can be subjected to an electrolysis treatment, to modify its surface. As an electrolyte used in the electrolysis, acidic solutions such as sulfuric acid, nitric acid, hydrochloric acid, or alkalis such as sodium hydroxide, potassium hydroxide, tetraethyl ammonium hydroxide or salts thereof as an aqueous solution, can be used. The amount of electricity required for the electrolysis can be properly selected depending on carbon fiber to which it is applied.

By the electrolysis treatment, an adhesive property between the carbon fiber material and a matrix of the obtained composite material can be made appropriate, and problems such as a brittle breakage of the composite due to a too strong adhesion, a problem that tensile strength in fiber direction decreases, or a problem that, although tensile strength in fiber direction is high, strength characteristics in non-fiber direction is not exhibited due to low adhesion with the resin, are solved, and in the obtained composite material, a strength characteristics well-balanced in both directions of fiber direction and non-fiber direction becomes to be exhibited.

After that, to impart to the obtained carbon fiber a bundle unity, it is possible to subject it to a sizing treatment. As the sizing agent, it is possible to properly select a sizing agent which is compatible with a resin depending on kind of the resin.

In the case where a carbon fiber is obtained via the flame resistant fiber from the flame resistant polymer, it can be produced, after a solution containing the flame resistant polymer is spun to make the flame resistant fiber continuously up to a carbonization treatment without including a winding step, and further the surface treatment and the sizing agent imparting step are included as one process.

In view of low cost, it is preferable to produce the carbon fiber from the flame resistant polymer to the carbon fiber continuously as one process.

EXAMPLES

Next, we present examples. In the examples, each value of physical properties or characteristics was measured in the following way.

Degree of Swelling of Coagulated Yarn

It was determined by using the following equation based on a weight (W) after sufficiently removing deposited water on surface of coagulated yarn and a weight (W0) after drying this at 180° C. for 2 hours by a hot air dryer:

$$B = \{(W - W0)/W0\} \times 100 (\%).$$

Concentration of Solution Containing Flame Resistant Polymer

Approximately 15 mg of a solution containing a flame resistant polymer was precisely weighed and heated at a rate of 20° C./minute from 25° C. up to 300° C. by using a thermogravimetric balance (abbreviated as TG instrument), at which point of time the residual solid content was measured as the amount of flame resistant polymer, and the amount of the flame resistant polymer was divided by the amount of the solution containing flame resistant polymer to calculate a concentration of the flame resistant polymer (% in weight) in percentages. Here, as the thermogravimetric balance, TG-DTA 2000 SA manufactured by Seiko Instruments Inc. was used.

In a case where a flame resistant polymer is completely coagulated in water, 5 g of a solution containing the flame resistant polymer was repeatedly treated three times for 30 minutes with 0.1 liter water heated to 90° C. to collect solid components only, which were dried at a temperature of 120° C. for 1 hour to separate the flame resistant polymer. The weight thereof was measured, and the amount of the flame resistant polymer was divided by the amount of the solution of the flame resistant polymer to calculate a flame resistant polymer concentration (%) in percentages.

Viscosity of Solution Containing Flame Resistant Polymer

By using Soliquidmeter (manufactured by Rheorogies Inc.) which is a plate-plate type rheometer, the viscosity was measured on the conditions of a frequency of 0.1 Hz and an amplitude of 1°. With regard to the measuring temperature, a measurement was carried out through 25° C. to 150° C. and a value at 50° C. was taken as the representative value.

Evaluation Method of Flame Resistance

A. Polymer of Indefinite Shape

Flame resistance of each sample was evaluated on selected conditions, but by the method according to the fire resistance test method of thin materials (45° Meckel burner method) in JIS Z 2150 (1966). In a case of a polymer of indefinite shape, it was grounded into particles of approximately 20 μm, which were made into a disk having a diameter of 20 mm and a thickness of 1 mm by using a pressure molding machine (a pressure of 10 MPa) to obtain a sample. This disk was set in a test piece supporting frame inclined by 45° placed in a combustion test box, and heated with fire of a Meckel burner having a height of 160 mm and an inside diameter of 20 mm for 10 seconds to evaluate an after-flame time and whether the disk was left as a carbide or not after combustion. The shorter the after-flame time, namely, time when the sample continued to burn with a flame after the end of the heating, the more excellent, but the whole area including the carbide retaining the shape of the sample was measured, and if 70% or more of the area before measurement remained, the flame resistant performance was evaluated as 'excellent.' If 40 to 70% or more thereof remained, the flame resistant performance was determined as 'favorable' and if less than 40% thereof remained, the flame resistant performance was determined as 'poor.'

B. Fiber

In case of a fiber, 1500 filaments obtained by paralleling was made into a sample length of 30 cm to measure the after-flame time and the carbonized length by the flame of the same Meckel burner in the same way as the evaluation of flame resistant polymer, and evaluate the flame resistance from the values. The following conditions were determined: excellent flame resistance (after-flame time of 10 seconds or less, carbonized length of 5 cm or less), favorable flame resistance (after-flame time of 10 seconds or less, carbonized length of 10 cm or less), flame resistant (after-flame time of 10 seconds or less, carbonized length of 15 cm or less) or poor flame resistance (after-flame time of more than 10 seconds, carbonized length of more than 15 cm). The number of measurement was n=5 and the most frequent state was taken as the flame resistance of the sample.

Single Fiber Tensile Strength of Various Fibers

A tensile test was performed for either of the fibers in accordance with JIS L1015 (1981). Single fiber having a length of 25 mm was firmly fixed one by one with an adhesive to a slip of paper with smooth and glossy surface at intervals of 5 mm-width in a state such that both ends thereof were loosely strained to have a sample length of approximately 20 mm. The sample was fixed to grips of a single fiber tensile tester and the slip of paper was cut near the upper grip, and measured at a sample length of 20 mm and a tensile speed of 20 mm/minute. The number of measurement was n=50 and the average value was taken as the tensile strength.

Specific Gravity Measurement in Various Fiber Assemblies

Automatic specific gravity measuring device equipped with an electronic balance for an immersion method was made oneself, concretely, ethanol was used for a fiber assembly before carbonization treatment and dichlorobenzene was used for a fiber assembly after carbonization treatment, into which a sample was put and measured. Here, the sample was previously wetted sufficiently in another bath by using ethanol or dichlorobenzene before being put to perform defoaming operation.

Coefficient of Variation of Cross-Section Areas of Single Fiber

The coefficient of variation of cross-section areas of single fiber was determined in the following way. A yarn bundle in which single fibers were parallelly arranged was sampled at an arbitrary position by 5 cm and the whole fiber bundle was fixed by embedding into an epoxy resin. This fiber bundle was cut by a microtome to clearly expose its cross-section, and the whole cut piece was observed by a microscope, magnified 1000 times and a photograph was taken. The photograph of the single fiber cross-section areas of all the single fibers were digitized into white and black, as an image data, and a coefficient of variation was calculated and determined through an image analysis.

Measurement of Crystallinity of Various Fibers

Fibers were cut into a length of 4 cm, fixed by using a metal mold and an alcoholic solution of collodion and made into a square pillar as a measurement sample. The measurement was performed with CuKα (Ni filter) as an X-ray source at an output of 40 kV and 20 mA by using a wide-angle X-ray diffractometry device. Here, in the examples, as the wide angle X-ray diffractometry device, a wide angle X-ray diffractometry device manufactured by Rigaku Denki Corporation was used.

With regard to the crystal size, by taking a pattern in equatorial direction, it was calculated by Debye-Scherrer equation from the half-band width of the 002 diffraction peak.

Residual Amount of Acrylic Group 2 mg of a fiber sample finely crushed by freeze-crushing was weighed, and further crushed and mixed in a mortar with 300 mg of KBr. This was pelletized under vacuum, and was subjected to an infra-red spectroscopy by FT-IR instrument, PARAGON 1000, manufactured by Perkin Elmer. The area of peak appeared in vicinity of 2240 $cm^{-1}$ was measured, and from peak area of PAN and the IR peak area of the sample measured, the residual ratio of acrylic group was determined according to the following equation:

Residual ratio of acrylic group (%)=IR peak area of sample measured/peak area of PAN×100.

Compressive Strength

Figure 2:
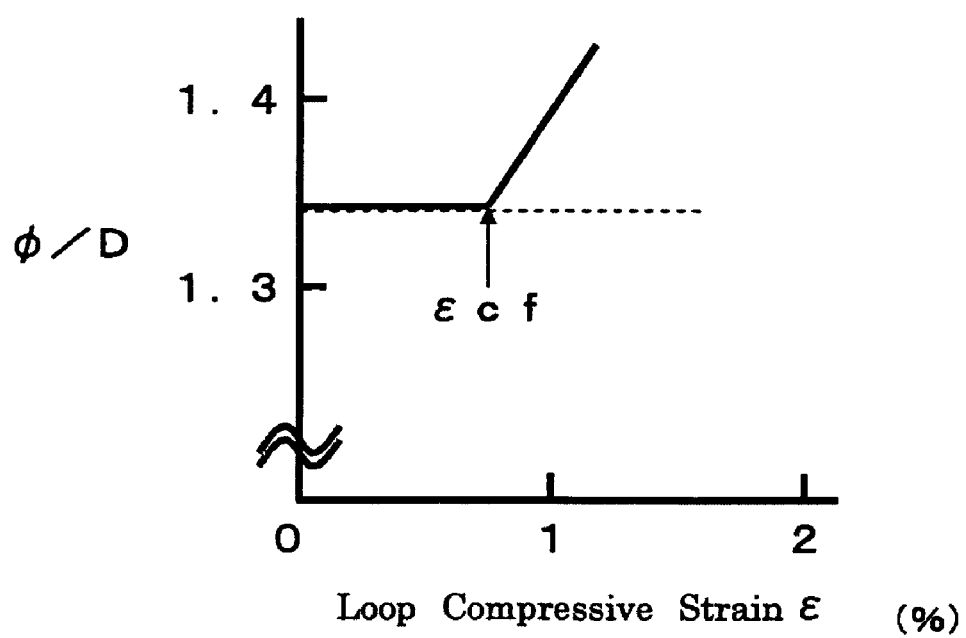
FIG. 2 is a graph which shows the position of compressive strain at yield ($\epsilon cl$) by plotting the loop compressive strain ($\epsilon$) along the horizontal axis and the ratio of major diameter and minor diameter ($\phi/D$) along the vertical axis, which are used at determining the loop compressive strength of carbon fiber.

A single fiber of approximately 10 cm was put on a slide glass, one or two drops of glycerin were dropped on its center portion, a loop was formed while twisting the single fiber and a prepared slide was placed thereon. This was placed under a microscope and imaged on a monitor (CRT) by a video camera connected to the microscope, and while observing the loop always in eyesight, both ends of the loop were pulled in a constant speed to cause a strain while being pressed by fingers. The behavior up to break was recorded by the video and the minor diameter (D) and the major diameter (φ) of the loop shown in FIG. 1 were measured on the CRT while stopping a reproduced image. The strain (ε) on the point A in FIG. 1 was calculated from the single fiber diameter (d) and D by the following equation, and was plotted in a graph in which ε is the horizontal axis and ratio of the major diameter and the minor diameter, (φ/D), is the vertical axis (FIG. 2):

$$E=1.07\times d/D.$$

φ/D is approximately a constant value (about 1.34) in the region not compressively yielded, but when compressively yielded, it rapidly increases. Accordingly, the strain when φ/D starts to rapidly increase is taken as the compressive strain at yield (εcl). This is measured for 10 single fibers, and their average value is calculated. The value multiplied by the strand tensile modulus to the obtained average value is taken as single fiber compressive strength.

Specific Resistivity

A single fiber of approximately 10 cm is placed on a polyester film so as to be a straight line and its both ends are fixed with a silver paste. A detector is contacted to the silver pastes and an electric resistance R(Ω) of single fiber is measured. The fiber length L(mm) is determined by measuring again the distance between the silver pastes. Fiber cross-section area, S, is determined from the specific gravity (ρ) measurement and fiber weight per unit length (g/mm). The specific resistivity is calculated from the R, S and L. This is measured for three single fibers and there average is determined.

Example 1

AN 100 parts by weight, itaconic acid 0.6 parts by weight, DMSO 371 parts by weight, azobisisobutyronitrile (hereunder, abbreviated as ABIN) 0.4 parts by weight and octyl mercaptan 1 parts by weight were fed in a reaction vessel and, after replacing with nitrogen, heated and polymerized at 65° C. for 5 hours and at 75° C. for 7 hours, to prepare a solution containing PAN consisting of AN 99.5 mol % and itaconic acid 0.5 mol % in DMSO as the solvent. The whole reaction system was degassed by using a pump and after removing the monomers by vacuuming to 30 hPa, heated to 160° C. and DMSO and MEA were added to react for 60 minutes in a homogeneous condition. ONT was added and reacted at 160° C. for 120 minutes to obtain a black solution containing a flame resistant polymer. At this point, the feeding ratio in weight was PAN/DMSO/MEA/ONT=10/78/6/6.

The viscosity of the cooled and obtained solution containing flame resistant polymer was 50 Pa·s at 25° C. and 20 Pa·s at 50° C.

Further, this flame resistant polymer was poured into warm water, separated the coagulated polymer by a filtration and dried at 120° C. to isolate the flame resistant polymer.

When the concentration of the flame resistant polymer in this solution containing flame resistant polymer was measured, it was found to be 12.5 wt %. When the flame resistance of this flame resistant polymer was evaluated, the after-flame time was short as 8 seconds, the disk shape was kept in almost 100% and it was found that the flame resistance was excellent.

This solution containing flame resistant polymer was made into a fiber by a wet spinning apparatus. After the flame resistant polymer solution was passed through a sintered filter, it was extruded from a spinneret having 100 holes of 0.05 mm hole diameter into a bath of 20° C. of DMSO/water=50/50. At this point, the degree of swelling of the coagulated yarn was 700 wt %.

Furthermore, in a warm water bath of 80° C., it was drawn 1.3 times while replacing almost all solvents with water. After that, it was further washed by passing a roller at a roller speed of 10 m/min in a warm water bath. After that, it was dried for 3 minutes in a hot air circulating furnace at 220° C. for 3 minutes after being imparted with an aminosilicone oil agent. The specific gravity of the dried fiber was 1.30 and the elongation at break was 3%.

Furthermore, the dried fiber was heat treated for 3 minutes in a hot air circulating furnace at 300° C. while being drawn 1.5 times to obtain a flame resistant fiber bundle. The single fiber thickness of the obtained flame resistant fiber bundle was 1.0 dtex, the strength was 2.3 g/dtex, the elongation at break was 18% and, when a flame resistance was evaluated, it was found that the fiber had such an excellent flame resistance that it turned red hot without burning and the carbonized length was 1 cm. The degree of variation of single fiber cross-section areas was 15%, which was small in variation. The fiber was provided with such a sufficient molecular orientation and a structural denseness that the degree of orientation was 70% and the specific gravity was 1.46.

Furthermore, the flame resistant fiber bundle obtained from the flame resistant polymer was pre-carbonized in nitrogen atmosphere, at 300 to 800° C. and next, in nitrogen atmosphere, subjected to a carbonization treatment at 1400° C. to obtain a carbon fiber bundle. The strength of the obtained carbon fiber bundle was 3000 MPa, the modulus was 230 GPa and the specific gravity was 1.75.

Comparative Example 1

By using the same flame resistant polymer solution as that of Example 1, it was made into a fiber by the wet spinning apparatus in the same way. The flame resistant polymer solution was, after passing through a sintered filter, extruded into a bath of DMSO/water=10/90 of 20° C. from a spinneret having 100 holes of 0.05 mm diameter. At this point, the degree of swelling of the coagulated yarn was 80 wt %.

Furthermore, in a warm water bath of 80° C., a drawing was tried while replacing almost all solvents with water, but 0.9 times was the limit. After that, it was further washed in a warm water bath by passing rollers at a roller speed of 10 m/min. After that, it was imparted with an aminosilicone oil agent and then dried in a hot air circulating furnace at 220° C. for 3 minutes. The specific gravity of the dried fiber was 1.26 and the elongation at break was 1.5%.

Furthermore, a flame resistant fiber bundle was obtained by subjecting the dried fiber to a heat treatment in a hot air circulating furnace at 300° C. for 6 minutes while being drawn 1.1 times. The single fiber thickness of the obtained flame resistant fiber bundle was 1.0 dtex, the strength was 1.5 g/dtex, the elongation at break was 13%, and when the flame resistance was evaluated, it was found that the fiber had such an excellent flame resistance that it turned red hot without burning and the carbonized length was 1 cm, but the degree of variation of single fiber cross-section area was 35%, which is large in variation. The fiber was provided with such a low molecular orientation and a structural denseness that the degree of orientation was 60% and the specific gravity was 1.31.

Furthermore, the flame resistant fiber bundle obtained was pre-carbonized in nitrogen atmosphere, at 300 to 800° C. and next, in nitrogen atmosphere, subjected to a carbonization treatment at 1400° C. to obtain a carbon fiber bundle. The strength of the obtained carbon fiber bundle was 1800 MPa, the modulus was 180 GPa and the specific gravity was 1.50, all of them were lower than those of Example 1.

Comparative Example 2

AN 100 parts by weight, DMSO 371 parts by weight, ABIN 0.4 parts by weight and octyl mercaptan 1 parts by weight were fed into a reaction vessel and, after replacing with nitrogen, heated and polymerized at 65° C. for 5 hours and at 75° C. for 7 hours, to prepare a solution containing PAN consisting of AN 100 mol % in DMSO as a solvent. The whole reaction system was degassed by using a pump and after removing the monomers by vacuuming to 30 hPa, heated to 160° C., and DMSO, MEA and ONT were added thereto and reacted at 160° C. for 60 minutes to obtain a black solution containing a flame resistant polymer. At this point, the feeding ratio in weight was PAN/DMSO/MEA/ONT=10/74/13/3.

The viscosity of the cooled and obtained solution containing flame resistant polymer was 50 Pa·s at 25° C. and 20 Pa·s at 50° C.

Further, this flame resistant polymer was poured into warm water, the coagulated polymer was separated by a filtration and dried at 120° C. to isolate the flame resistant polymer. The residual ratio of acrylic group was 20%.

When the concentration of the flame resistant polymer in this solution containing flame resistant polymer was measured, it was found to be 12.5 wt %. When the flame resistance of this flame resistant polymer was evaluated, the after-flame time was short as 9 seconds, the disk shape was kept almost 100% and it was found that the flame resistance was excellent.

This solution containing flame resistant polymer was made into a fiber by a wet spinning apparatus, but the fiber obtained by, after being passed through a sintered filter, extruding the flame resistant polymer solution from a spinneret having 1000 holes of 0.06 mm hole diameter into a bath of 20° C. of DMSO/water=40/60, was large in the thickness variation and a fiber breakage occurred when pulled. At this point, the degree of swelling of the coagulated yarn was 1050 wt % which was very high.

Example 2

AN 100 parts by weight, DMSO 371 parts by weight, ABIN 0.4 parts by weight, octyl mercaptan 1 parts by weight were fed into a reaction vessel and, after replacing with nitrogen, heated and polymerized at 65° C. for 5 hours and at 75° C. for 7 hours, to prepare a solution containing PAN consisting of AN 100 mol % in DMSO as the solvent. The whole reaction system was degassed by using a pump and after removing the monomers by vacuuming to 30 hPa, heated to 160° C., and DMSO, MEA and ONT were added thereto and reacted at 160° C. for 60 minutes to obtain a black solution containing a flame resistant polymer. At this point, the feeding ratio in weight was PAN/DMSO/MEA/ONT=10/74/8/8.

The viscosity of the cooled and obtained solution containing flame resistant polymer was 50 Pa·s at 25° C. and 20 Pa·s at 50° C.

Further, this flame resistant polymer was poured into warm water, the coagulated polymer was separated by a filtration and dried at 120° C. to isolate the flame resistant polymer. The residual ratio of acrylic group was 40%.

When the concentration of the flame resistant polymer in this solution containing flame resistant polymer was measured, it was found to be 12.5 wt %. When the flame resistance of this flame resistant polymer was evaluated, the after-flame time was as short as 8 seconds, and maintained in an almost perfect disk shape, and it was found that the flame resistance was excellent.

This solution containing flame resistant polymer was made into a fiber by a wet spinning apparatus. The flame resistant polymer solution was extruded, after being passed through a sintered filter, from a spinneret having 1000 holes of 0.06 mm hole diameter into a bath of 20° C. of DMSO/water=40/60. At this point, the degree of swelling of the coagulated yarn was 450 wt %.

Furthermore, DMSO inside the fiber was gradually replaced with water by passing through a bath of DMSO/water=30/70 of 60° C., successively further through a bath of DMSO/water=20/80 of 70° C. while drawing the fiber 1.3 times, and finally, almost all solvents were replaced with water in a warm water bath of 70° C.

After that, the fiber was imparted with an aminosilicone oil agent as a process oil agent and dried for 3 minutes by a dry heat device of 200° C. The draw ratio of the drying step was 1.2 times. The specific gravity of the dried fiber was 1.27 and the elongation at break was 3.8%. The residual ratio of the acrylic group was 35%. The degree of variation of cross-sectional areas of single fiber was 12%. The calorific value by DSC was 86 J/g.

The dried fiber bundle, so-called dried yarn, was subjected to a steam drawing under the following conditions. With regard to the steam, it was introduced to a tubular treating member of 40 cm, 5 units having a 3 mm circular aperture were respectively provided to the both ends of this tube, and further a drain treatment portion was provided. A heater was provided around the tubular treating member to prevent an accumulation of drain. The steam pressure was 0.8 kg/cm$^2$, and the steam temperature was 112° C. The draw ratio was 2.2 times.

The fiber bundle after the drawing was dried by a roller of 180° C., to make the water content to 2.1%.

Furthermore, the fiber bundle was introduced to a hot air circulating furnace, drawn 1.1 times at 250° C. in the furnace and simultaneously heat treated for 20 minutes to obtain a flame resistant fiber bundle.

The single fiber thickness of the obtained flame resistant fiber bundle was 2.0 dtex, the strength was 2.5 cN/dtex, the elongation at break was 23%, and when the flame resistance was evaluated, it was found to be "excellent flame resistance." The degree of variation of cross-sectional areas of single fiber was 13%, which was small in variation. The fiber was provided with such a sufficient molecular orientation and a structural denseness that the degree of orientation was 73% and the specific gravity was 1.47.

When this flame resistant fiber was dry heat treated by an oven at 200° C. for 100 hours, its strength retention was 90%. When water 50 ml and the flame resistant fiber 0.1 g were put into a pressure resistant pot of 200 ml capacity and wet heat treated in an oven at 120° C. for 100 hours, the strength retention was 93%. When the fiber was treated with sodium hydrate of 40% concentration and sulfuric acid, maintained at 50° C., for 100 hours, the strength retentions were 91% and 93%, respectively. It was found that the fiber had a good resistance to the both treatments.

Example 3

A dried fiber was obtained in the same way as Example 2 except changing the drying conditions such that the fiber was dried for 10 minutes by a dry heat device of 150° C. and changing the draw ratio to 1.05 times. The specific gravity of the dried fiber was 1.21 and the elongation at break was 1.1%. The residual ratio of the acrylic group was 36%. The degree of variation of cross-sectional areas of single fiber was 22%. The calorific value by DSC was 89 J/g.

A flame resistant fiber bundle was obtained in the same way as Example 2 except using the obtained dried fiber and changing the draw ratio at the steam drawing to 2.4 times.

The single fiber thickness of the obtained flame resistant fiber bundle was 2.2 dtex, the strength was 2.7 cN/dtex, the elongation at break was 20% and, when the flame resistance was evaluated, it was found to be "favorable flame resistance." The degree of variation of cross-sectional areas of single fiber was 24%, which was small in variation. The fiber was provided with such a sufficient molecular orientation and a structural denseness that the degree of orientation was 75% and the specific gravity was 1.37.

When this flame resistant fiber was dry heat treated at 200° C. for 100 hours, its strength retention was 83%. When it was wet heat treated at 120° C. for 100 hours, the strength retention was 82%. When the fiber was treated with sodium hydrate of 40% concentration and sulfuric acid, maintained at 50° C., for 100 hours, the strength retentions were 78% and 81%, respectively. Although slightly inferior to Example 2, it was found that the fiber had a good resistance to both treatments.

Example 4

A dried yarn was obtained in the same way as Example 2 except changing the drying conditions such that the fiber was dried for 0.5 minutes by a dry heat device of 280° C. and changing the draw ratio to 1.48 times. The specific gravity of the dried fiber was 1.48 and the elongation at break was 4.6%. The residual ratio of the acrylic group was 33%. The degree of variation of cross-sectional areas of single fiber was 8%. The calorific value by DSC was 80 J/g.

A stabilized fiber bundle was obtained in the same way as Example 1 except using the obtained dried fiber and changing the draw ratio at the steam drawing to 1.8 times.

The single fiber thickness of the obtained flame resistant fiber bundle was 1.8 dtex, the strength was 1.8 cN/dtex, the elongation at break was 17% and, when the flame resistance was evaluated, it was found to be "excellent flame resistance." The degree of variation of cross-sectional areas of single fiber was 8%, which was small in variation. The fiber was provided with such a sufficient molecular orientation and a structural denseness that the degree of orientation was 70% and the specific gravity was 1.49.

When this flame resistant fiber was dry heat treated at 200° C. for 100 hours, its strength retention was 91%. When it was wet heat treated at 120° C. for 100 hours, the strength retention was 91%. When the fiber was treated with sodium hydrate of 40% concentration and sulfuric acid, maintained at 50° C., for 100 hours, the strength retentions were 90% and 93%, respectively. It was found that the fiber had a good resistance to both treatments.

Example 5

A dried yarn was obtained in the same way as Example 2 except changing the drying conditions such that the fiber was dried for 2 minutes by a dry heat device of 180° C. and changing the draw ratio to 1.1 times. The specific gravity of the dried fiber was 1.25 and the elongation at break was 2.4%. The residual ratio of the acrylic group was 36%. The degree of variation of cross-sectional areas of single fiber was 17%. The calorific value by DSC was 87 J/g.

It was drawn in the same way as Example 2 except using the obtained dried fiber and changing the draw ratio at the steam drawing to 2.3 times.

The single fiber thickness of the obtained flame resistant fiber bundle was 2.1 dtex, the strength was 2.6 cN/dtex, the elongation at break was 21% and, when the flame resistance was evaluated, it was found to be "favorable flame resistance." The degree of variation of cross-sectional areas of single fiber was 18%, which was small in variation. The fiber was provided with such a sufficient molecular orientation and a structural denseness that the degree of orientation was 74% and the specific gravity was 1.39.

When this flame resistant fiber was dry heat treated at 200° C. for 100 hours, its strength retention was 82%. When it was wet heat treated at 120° C. for 100 hours, the strength retention was 84%. When the fiber was treated with sodium hydrate of 40% concentration and sulfuric acid, maintained at 50° C., for 100 hours, the strength retentions were 80% and 86%, respectively. It was found that the fiber had a good resistance to both treatments.

Example 6

A dried yarn was obtained in the same way as Example 2 except changing the drying conditions such that the fiber was dried for 1 minute by a dry heat device of 250° C. and changing the draw ratio to 1.4 times. The specific gravity of the dried fiber was 1.39 and the elongation at break was 4.1%. The residual ratio of the acrylic group was 34%. The degree of variation of cross-sectional areas of single fiber was 10%. The calorific value by DSC was 86 J/g.

A flame resistant fiber bundle was obtained in the same way as Example 2 except using the obtained dried fiber and changing the draw ratio at the steam drawing to 1.9 times.

The single fiber thickness of the obtained flame resistant fiber bundle was 2.0 dtex, the strength was 2.0 cN/dtex, the elongation at break was 19% and, when the flame resistance was evaluated, it was found to be "excellent flame resistance." The degree of variation of cross-sectional areas of single fiber was 13%, which was small in variation. The fiber was provided with such a sufficient molecular orientation and a structural denseness that the degree of orientation was 72% and the specific gravity was 1.48.

When this flame resistant fiber was dry heat treated at 200° C. for 100 hours, its strength retention was 92%. When it was wet heat treated at 120° C. for 100 hours, the strength retention was 95%. When the fiber was treated with sodium hydrate of 40% concentration and sulfuric acid, maintained at 50° C., for 100 hours, the strength retentions were 90% and 92%, respectively. It was found that the fiber had a good resistance to both treatments.

Example 7

A dried yarn was obtained in the same way as Example 2 except changing the drying conditions such that the fiber was dried for 1 minute by a hot plate of 130° C. and changing the draw ratio to 1.1 times. The specific gravity of the dried fiber was 1.26 and the elongation at break was 0.9%. The residual ratio of the acrylic group was 38%. The degree of variation of cross-sectional areas of single fiber was 23%. The calorific value by DSC was 90 J/g.

A flame resistant fiber bundle was obtained in the same way as Example 2 except using the obtained dried fiber and changing the draw ratio at the steam drawing to 2.4 times.

The single fiber thickness of the obtained flame resistant fiber bundle was 2.2 dtex, the strength was 1.5 cN/dtex, the elongation at break was 12% and, when the flame resistance was evaluated, it was found to be "favorable flame resistance." The degree of variation of cross-sectional areas of single fiber was 26%, which was small in variation. The fiber was provided with such a sufficient molecular orientation and a structural denseness that the degree of orientation was 68% and the specific gravity was 1.36.

When this flame resistant fiber was dry heat treated at 200° C. for 100 hours, its strength retention was 85%. When it was wet heat treated at 120° C. for 100 hours, the strength retention was 83%. When the fiber was treated with sodium hydrate of 40% concentration and sulfuric acid, maintained at 50° C., for 100 hours, the strength retentions were 70% and 82%, respectively. Although slightly inferior to Example 2 etc., it was found that the fiber had a good resistance to both treatments.

Example 8

A flame resistant fiber bundle was obtained in the same way as Example 2 except changing the steam drawing to a drawing in a hot water bath of 90° C. of which draw ratio was 1.7 times.

The single fiber thickness of the obtained flame resistant fiber bundle was 2.2 dtex, the strength was 1.7 cN/dtex, the elongation at break was 25% and, when the flame resistance was evaluated, it was found to be "excellent flame resistance." The degree of variation of cross-sectional areas of single fiber was 12%, which was small in variation. The fiber was provided with such a sufficient molecular orientation and a structural denseness that the degree of orientation was 67% and the specific gravity was 1.42.

When this flame resistant fiber was dry heat treated at 200° C. for 100 hours, its strength retention was 91%. When it was wet heat treated at 120° C. for 100 hours, the strength retention was 93%. When the fiber was treated with sodium hydrate of 40% concentration and sulfuric acid, maintained at 50° C., for 100 hours, the strength retentions were 87% and 90%, respectively. It was found that the fiber had a good resistance to both treatments.

Example 9

A flame resistant fiber bundle was obtained in the same way as Example 2 except changing the steam drawing to a drawing in a hot water bath of 70° C. of which draw ratio was 1.5 times.

The single fiber thickness of the obtained flame resistant fiber bundle was 2.3 dtex, the strength was 1.6 cN/dtex, the elongation at break was 28% and, when the flame resistance was evaluated, it was found to be "excellent flame resistance." The degree of variation of cross-sectional areas of single fiber was 14%, which was small in variation. The fiber was provided with such a sufficient molecular orientation and a structural denseness that the degree of orientation was 66% and the specific gravity was 1.40.

When this flame resistant fiber was dry heat treated at 200° C. for 100 hours, its strength retention was 87%. When it was wet heat treated at 120° C. for 100 hours, the strength retention was 90%. When the fiber was treated with sodium hydrate of 40% concentration and sulfuric acid, maintained at 50° C., for 100 hours, the strength retentions were 84% and 89%, respectively. It was found that the fiber had a good resistance to both treatments.

Example 10

AN 100 parts by weight, DMSO 371 parts by weight, ABIN 0.4 parts by weight, octyl mercaptan 1 part by weight were fed into a reaction vessel and, after replacing with nitrogen, heated and polymerized at 65° C. for 5 hours and at 75° C. for 7 hours, to prepare a solution containing PAN consisting of AN 100 mol % in DMSO as the solvent. The whole reaction system was degassed by using a pump and after removing the monomers by vacuuming to 30 hPa, heated to 160° C., and DMSO, MEA and ONT were added thereto and reacted at 160° C. for 65 minutes to obtain a black solution containing a flame resistant polymer. At this point, the feeding ratio in weight was PAN/DMSO/MEA/ONT=10/74/8/8.

The viscosity of the cooled and obtained solution containing flame resistant polymer was 50 Pa·s at 25° C. and 20 Pa·s at 50° C.

Further, this flame resistant polymer was poured into warm water, the coagulated polymer was separated by a filtration and dried at 120° C. to isolate the flame resistant polymer. The residual ratio of acrylic group was 14%.

When the concentration of the flame resistant polymer in this solution containing flame resistant polymer was measured, it was found to be 12.5 wt %. When the flame resistance of this flame resistant polymer was evaluated, the after-flame time was short as 8 seconds, the disk shape was kept almost 100% and it was found that the flame resistance was excellent.

A dried yarn was obtained in the same way as Example 2, except using thus obtained flame resistant polymer. The degree of swelling of the coagulated yarn was 380 wt %. The specific gravity of the dried fiber was 1.33 and the elongation at break was 4.9%. The residual ratio of the acrylic group was 12%. The degree of variation of cross-sectional areas of single fiber was 11%. The calorific value by DSC was 31 J/g.

A flame resistant fiber bundle was obtained in the same way as Example 2, except using the obtained dried fiber and changing the draw ratio at the steam drawing to 1.6 times.

The single fiber thickness of the obtained flame resistant fiber bundle was 2.2 dtex, the strength was 1.7 cN/dtex, the elongation at break was 14% and, when the flame resistance was evaluated, it was found to be "excellent flame resistance." The degree of variation of cross-sectional areas of single fiber was 13%, which was small in variation. The fiber was provided with such a sufficient molecular orientation and a structural denseness that the degree of orientation was 65% and the specific gravity was 1.49.

When this flame resistant fiber was dry heat treated at 200° C. for 100 hours, its strength retention was 91%. When it was wet heat treated at 120° C. for 100 hours, the strength retention was 92%. When the fiber was treated with sodium hydrate of 40% concentration and sulfuric acid, maintained at 50° C., for 100 hours, the strength retentions were 90% and 93%, respectively. It was found that the fiber had a good resistance to both treatments.

Example 11

AN 100 parts by weight, DMSO 371 parts by weight, ABIN 0.4 parts by weight, octyl mercaptan 1 part by weight were fed into a reaction vessel and, after replacing with nitrogen, heated and polymerized at 65° C. for 5 hours and at 75° C. for 7 hours, to prepare a solution containing PAN consisting of AN 100 mol % in DMSO as the solvent. The whole reaction system was degassed by using a pump and after removing the monomers by vacuuming to 30 hPa, heated to 160° C., and DMSO, MEA and ONT were added thereto and reacted at 160° C. for 55 minutes to obtain a black solution containing a flame resistant polymer. At this point, the feeding ratio in weight was PAN/DMSO/MEA/ONT=10/74/8/8.

The viscosity of the cooled and obtained solution containing flame resistant polymer was 50 Pa·s at 25° C. and 20 Pa·s at 50° C.

Further, this flame resistant polymer was poured into warm water, the coagulated polymer was separated by a filtration and dried at 120° C. to isolate the flame resistant polymer. The residual ratio of acrylic group was 50%.

When the concentration of the flame resistant polymer in this solution containing flame resistant polymer was measured, it was found to be 12.5 wt %. When the flame resistance of this flame resistant polymer was evaluated, the after-flame time was short as 8 seconds, the disk shape was kept almost 100% and it was found that the flame resistance was excellent.

A dried yarn was obtained in the same way as Example 2, except using thus obtained flame resistant polymer. The degree of swelling of the coagulated yarn was 450 wt %. The specific gravity of the dried fiber was 1.22 and the elongation at break was 0.6%. The residual ratio of the acrylic group was 48%. The degree of variation of cross-sectional areas of single fiber was 13%. The calorific value by DSC was 123 J/g.

A flame resistant fiber bundle was obtained in the same way as Example 2, except using the obtained dried fiber and changing the draw ratio at the steam drawing to 2.6 times.

The single fiber thickness of the obtained flame resistant fiber bundle was 2.1 dtex, the strength was 2.3 cN/dtex, the elongation at break was 22% and, when the flame resistance was evaluated, it was found to be 'flame resistance.' The degree of variation of cross-sectional areas of single fiber was 16%, which was small in variation. The fiber was provided with such a sufficient molecular orientation and a structural denseness that the degree of orientation was 74% and the specific gravity was 1.50.

When this flame resistant fiber was dry heat treated at 200° C. for 100 hours, its strength retention was 77%. When it was wet heat treated at 120° C. for 100 hours, the strength retention was 83%. When the fiber was treated with sodium hydrate of 40% concentration and sulfuric acid, maintained at 50° C., for 100 hours, the strength retentions were 76% and 80%, respectively. It was found that the fiber had a good resistance to both treatments.

Example 12

A flame resistant fiber bundle was obtained in the same way as Example 2 except changing, at the steam drawing, the steam pressure to 4.2 kg/cm$^2$, the temperature to 148° C. and the draw ratio to 2.0 times. The single fiber thickness of the obtained flame resistant fiber bundle was 2.2 dtex, the strength was 2.3 cN/dtex, the elongation at break was 20% and, when the flame resistance was evaluated, it was found to be 'excellent flame resistance.' The degree of variation of cross-sectional areas of single fiber was 15%, which was small in variation. The fiber was provided with such a sufficient molecular orientation and a structural denseness that the degree of orientation was 71% and the specific gravity was 1.45.

When this flame resistant fiber was dry heat treated at 200° C. for 100 hours, its strength retention was 92%. When it was wet heat treated at 120° C. for 100 hours, the strength retention was 92%. When the fiber was treated with sodium hydrate of 40% concentration and sulfuric acid, maintained at 50° C., for 100 hours, the strength retentions were 90% and 94%, respectively. It was found that the fiber had a good resistance to both treatments.

Example 13

AN 100 parts by weight, DMSO 371 parts by weight, ABIN 0.4 parts by weight and octyl mercaptan 1 parts by weight were fed into a reaction vessel and, after replacing with nitrogen, heated and polymerized at 65° C. for 5 hours and at 75° C. for 7 hours, to prepare a solution containing PAN consisting of AN 100 mol % in DMSO as the solvent. The whole reaction system was degassed by using a pump and after removing the monomers by vacuuming to 30 hPa, heated to 160° C., and DMSO, MEA and ONT were added thereto and reacted at 160° C. for 60 minutes to obtain a black solution containing a flame resistant polymer. At this point, the feeding ratio in weight was PAN/DMSO/MEA/ONT=10/74/8/8.

The viscosity of the cooled and obtained solution containing flame resistant polymer was 50 Pa·s at 25° C. and 20 Pa·s at 50° C.

Further, this flame resistant polymer was poured into warm water, the coagulated polymer was separated by a filtration and dried at 120° C. to isolate the flame resistant polymer. The residual ratio of acrylic group was 35%.

When the concentration of the flame resistant polymer in this solution containing flame resistant polymer was measured, it was found to be 12.5 wt %. When the flame resistance of the isolated flame resistant polymer was evaluated, the after-flame time was short as 8 seconds, the disk shape was kept almost 100% and it was found that the flame resistance was excellent.

This solution containing flame resistant polymer was made into a fiber by a wet spinning apparatus. The flame resistant polymer solution was extruded, after being passed through a sintered filter, from a spinneret having 1000 holes of 0.06 mm hole diameter into a bath of 20° C. of DMSO/water=40/60. At this point, the degree of swelling of the coagulated yarn was 700 wt %.

Furthermore, DMSO inside the fiber was gradually replaced with water by passing through a bath of DMSO/water=30/70 of 60° C., successively further through a bath of DMSO/water=20/80 of 70° C. while drawing the fiber 1.3 times, and finally, almost all solvents were replaced with water in a warm water bath of 70° C. After that, the fiber was imparted with an aminosilicone oil agent as a process oil agent and provided to a drying step in which it was dried for 3 minutes by a dry heat device of 200° C. The draw ratio of the drying step was 1.2 times.

The dried fiber was next subjected to a so-called steam drawing in which a drawing is carried out in steam. With regard to the steam, it was introduced to a tubular treating member of 40 cm, 5 units having a 3 mm circular aperture were respectively provided to the both ends of this tube, and further a drain treatment portion was provided. A heater was provided around the tubular treating member to prevent an accumulation of drain. The steam pressure was 0.8 kg/cm$^2$, and the steam temperature was 112° C. The draw ratio in the steam drawing step was 2.1 times.

The fiber bundle after the steam drawing was dried by a roller of 180° C., to make the water content to 2.1%.

Furthermore, the fiber bundle thus obtained was introduced to a hot air circulating furnace, drawn 1.1 times at 270° C. in the furnace and simultaneously heat treated for 15 minutes to obtain a flame resistant fiber bundle.

The tensile strength of single fiber of the obtained flame resistant fiber bundle was 2.3 cN/dtex, the tensile elongation at break was 20%, and when the flame resistance was evaluated, it was found that the fiber had such an excellent flame resistance that it turned red hot without burning. The fiber was provided with such a sufficient molecular orientation and a structural denseness that the degree of orientation was 73% and the specific gravity was 1.47.

Furthermore, the obtained flame resistant fiber bundle was, as the first carbonizing step, pre-carbonized in nitrogen atmosphere at a temperature of 650° C. for 2 minutes under a draw ratio of 1 time, and then as the second carbonizing step, subjected to a carbonization treatment in nitrogen atmosphere at a temperature of 1450° C. for 3 minutes under a draw ratio of 0.96 times to obtain a carbon fiber bundle. Of the obtained carbon fiber bundle, the tensile strength of single fiber was 3.3 GPa, the tensile modulus was 260 GPa, the specific gravity was 1.88. The carbon fiber had such an excellent compressive strength, specific resistivity and mechanical characteristics that the crystal size was 1.8 nm, the compressive strength was 4.88 GPa and the specific resistivity was $1.3 \times 10^{-3}$ Ω·cm.

Example 14

A flame resistant fiber bundle and a carbon fiber bundle were obtained in the same way as Example 2 except changing, in the drying step, the temperature to 150° C., the time to 10 minutes and the draw ratio to 1.05 times and, in the steam drawing step, the draw ratio to 2.3 times.

The tensile strength of single fiber of the obtained flame resistant fiber bundle was 2.4 cN/dtex, the tensile elongation at break was 17% and, when the flame resistance was evaluated, it was found that the fiber had such an excellent flame resistance that it turned red hot without burning. The fiber was provided with such a sufficient molecular orientation and a structural denseness that the degree of orientation was 74% and the specific gravity was 1.38.

Of the obtained carbon fiber bundle, the tensile strength of single fiber was 3.0 GPa, the tensile modulus was 230 GPa and the specific gravity was 1.84. The carbon fiber had such an excellent compressive strength, specific resistivity and mechanical characteristics that the crystal size was 1.9 nm, the compressive strength was 4.71 GPa and the specific resistivity was $1.3 \times 10^{-3}$ Ω·cm.

Example 15

A flame resistant fiber bundle and a carbon fiber bundle were obtained in the same way as Example 2 except changing, in the drying step, the temperature to 280° C., the time to 0.5 minutes and the draw ratio to 1.48 times and, in the steam drawing step, the draw ratio to 1.7 times.

The tensile strength of single fiber of the obtained flame resistant fiber bundle was 1.7 cN/dtex, the tensile elongation at break was 17% and, when the flame resistance was evaluated, it was found that the fiber had such an excellent flame resistance that it turned red hot without burning. The fiber was provided with such a sufficient molecular orientation and a structural denseness that the degree of orientation was 70% and the specific gravity was 1.53.

Of the obtained carbon fiber bundle, the tensile strength of single fiber was 3.1 GPa, the tensile modulus was 250 GPa and the specific gravity was 1.86. The carbon fiber had such an excellent compressive strength, specific resistivity and mechanical characteristics that the crystal size was 1.9 nm, the compressive strength was 4.74 GPa and the specific resistivity was $1.3 \times 10^{-3}$ Ω·cm.

Example 16

A flame resistant fiber bundle and a carbon fiber bundle were obtained in the same way as Example 2 except changing, in the drying step, the dry heat device to a hot plate contact device, its temperature to 130° C., the treating time to 1 minute and the draw ratio to 1.1 times and, in the steam drawing step, the draw ratio to 2.3 times.

The tensile strength of single fiber of the obtained flame resistant fiber bundle was 1.5 cN/dtex, the tensile elongation at break was 13% and, when the flame resistance was evaluated, it was found that the fiber had such an excellent flame resistance that it turned red hot without burning. The fiber was provided with such a sufficient molecular orientation and a structural denseness that the degree of orientation was 68% and the specific gravity was 1.37.

Of the obtained carbon fiber bundle, the tensile strength of single fiber was 3.2 GPa, the tensile modulus was 230 GPa and the specific gravity was 1.83. The carbon fiber had such an excellent compressive strength, specific resistivity and mechanical characteristics that the crystal size was 2.3 nm, the compressive strength was 4.57 GPa and the specific resistivity was $1.3 \times 10^{-3}$ Ω·cm.

Example 17

A flame resistant fiber bundle and a carbon fiber bundle were obtained in the same way as Example 2 except changing the steam drawing to a hot water bath drawing and its temperature to 90° C. and the draw ratio to 1.5 times.

The tensile strength of single fiber of the obtained flame resistant fiber bundle was 1.7 cN/dtex, the tensile elongation at break was 23% and, when the flame resistance was evaluated, it was found that the fiber had such an excellent flame resistance that it turned red hot without burning. The fiber was provided with such a sufficient molecular orientation and a structural denseness that the degree of orientation was 67% and the specific gravity was 1.44.

Of the obtained carbon fiber bundle, the tensile strength of single fiber was 2.9 GPa, the tensile modulus was 220 GPa and the specific gravity was 1.90. The carbon fiber had such an excellent compressive strength, specific resistivity and mechanical characteristics that the crystal size was 2.2 nm, the compressive strength was 4.60 GPa and the specific resistivity was $1.4 \times 10^{-3}$ Ω·cm.

Example 18

A flame resistant fiber bundle and a carbon fiber bundle were obtained in the same way as Example 2 except changing the steam drawing to a hot water bath drawing and its temperature to 70° C. and the draw ratio to 1.4 times.

The tensile strength of single fiber of the obtained flame resistant fiber bundle was 1.6 cN/dtex, the tensile elongation at break was 30% and, when the flame resistance was evaluated, it was found that the fiber had such an excellent flame resistance that it turned red hot without burning. The fiber was provided with such a sufficient molecular orientation and a structural denseness that the degree of orientation was 66% and the specific gravity was 1.42.

Of the obtained carbon fiber bundle, the tensile strength of single fiber was 2.7 GPa, the tensile modulus was 210 GPa and the specific gravity was 1.92. The carbon fiber had such an excellent compressive strength, specific resistivity and mechanical characteristics that the crystal size was 2.4 nm, the compressive strength was 4.52 GPa and the specific resistivity was $1.4 \times 10^{-3}$ Ω·cm.

Example 19

A solution containing PAN consisting of AN 100 mol % in DMSO as a solvent was degassed by using a pump and after removing the monomers by vacuuming to 30 hPa, heated to 160° C. and DMSO, MEA and ONT were added to react at 160° C. for 70 minutes to obtain a black solution containing a flame resistant polymer. At this point, the feeding ratio in weight was PAN/DMSO/MEA/ONT=10/74/8/8 and the residual ratio of acrylic group was 15%. A flame resistant fiber bundle and a carbon fiber bundle were obtained in the same way as Example 1 except changing, in the steam drawing step, the draw ratio to 1.5 times, and in the heat treating step, the heat treating time to 10 minutes.

The tensile strength of single fiber of the obtained flame resistant fiber bundle was 1.7 cN/dtex, the tensile elongation at break was 14% and, when the flame resistance was evaluated, it was found that the fiber had such an excellent flame resistance that it turned red hot without burning. The fiber was provided with such a sufficient molecular orientation and a structural denseness that the degree of orientation was 65% and the specific gravity was 1.51.

Of the obtained carbon fiber bundle, the tensile strength of single fiber was 2.9 GPa, the tensile modulus was 225 GPa and the specific gravity was 1.91. The carbon fiber had such an excellent compressive strength, specific resistivity and mechanical characteristics that the crystal size was 2.2 nm, the compressive strength was 4.59 GPa and the specific resistivity was $1.3 \times 10^{-3}$ Ω·cm.

Example 20

A solution containing PAN consisting of AN 100 mol % in DMSO as a solvent was degassed by using a pump and, after removing the monomers by vacuuming to 30 hPa, heated to 160° C. and DMSO, MEA and ONT were added to react at 160° C. for 50 minutes to obtain a black solution containing a flame resistant polymer. At this point, the feeding ratio in weight was PAN/DMSO/MEA/ONT=10/74/8/8 and the residual ratio of acrylic group was 47%. A flame resistant fiber bundle and a carbon fiber bundle were obtained in the same way as Example 1 except changing, in the steam drawing step, the draw ratio to 2.5 times, and in the heat treating step, the heat treating time to 20 minutes.

The tensile strength of single fiber of the obtained flame resistant fiber bundle was 2.3 cN/dtex and the tensile elongation at break was 22% and, when the flame resistance was evaluated, it was found that the fiber had such an excellent flame resistance that it turned red hot without burning. The fiber was provided with such a sufficient molecular orientation and a structural denseness that the degree of orientation was 74% and the specific gravity was 1.52.

Of the obtained carbon fiber bundle, the tensile strength of single fiber was 3.2 GPa, the tensile modulus was 255 GPa and the specific gravity was 1.86. The carbon fiber had such an excellent compressive strength, specific resistivity and mechanical characteristics that the crystal size was 1.8 nm, the compressive strength was 4.84 GPa and the specific resistivity was $1.5 \times 10^{-3}$ Ω·cm.

Example 21

A flame resistant fiber bundle and a carbon fiber bundle were obtained in the same way as Example 2, except changing, in the steam drawing step, the temperature to 148° C. and the draw ratio to 2.0 times.

The tensile strength of single fiber of the obtained flame resistant fiber bundle was 2.1 cN/dtex and the tensile elongation at break was 19% and, when the flame resistance was evaluated, it was found that the fiber had such an excellent flame resistance that it turned red hot without burning. The fiber was provided with such a sufficient molecular orientation and a structural denseness that the degree of orientation was 71% and the specific gravity was 1.46.

Of the obtained carbon fiber bundle, the tensile strength of single fiber was 3.1 GPa, the tensile modulus was 245 GPa and the specific gravity was 1.88. The carbon fiber had such an excellent compressive strength, specific resistivity and mechanical characteristics that the crystal size was 1.7 nm, the compressive strength was 4.95 GPa and the specific resistivity was $1.3 \times 10^{-3}$ Ω·cm.

Example 22

A flame resistant fiber bundle and a carbon fiber bundle were obtained in the same way as Example 2, except changing, in the heat treatment step, the temperature to 290° C., the time to 5 minutes and the draw ratio to 1.3 times.

The tensile strength of single fiber of the obtained flame resistant fiber bundle was 2.4 cN/dtex and the tensile elongation at break was 18% and, when the flame resistance was evaluated, it was found that the fiber had such an excellent flame resistance that it turned red hot without burning. The fiber was provided with such a sufficient molecular orientation and a structural denseness that the degree of orientation was 73% and the specific gravity was 1.48.

Of the obtained carbon fiber bundle, the tensile strength of single fiber was 3.0 GPa, the tensile modulus was 235 GPa and the specific gravity was 1.92. The carbon fiber had such an excellent compressive strength, specific resistivity and mechanical characteristics that the crystal size was 2.2 nm, the compressive strength was 4.65 GPa and the specific resistivity was $1.2 \times 10^{-3}$ Ω·cm.

Example 23

A flame resistant fiber bundle and a carbon fiber bundle were obtained in the same way as Example 2, except changing, in the heat treatment step, the temperature to 240° C., the time to 30 minutes and the draw ratio to 1.05 times.

The tensile strength of single fiber of the obtained flame resistant fiber bundle was 2.2 cN/dtex and the tensile elongation at break was 21% and, when the flame resistance was evaluated, it was found that the fiber had such an excellent flame resistance that it turned red hot without burning. The fiber was provided with such a sufficient molecular orientation and a structural denseness that the degree of orientation was 71% and the specific gravity was 1.45.

Of the obtained carbon fiber bundle, the tensile strength of single fiber was 3.0 GPa, the tensile modulus was 240 GPa and the specific gravity was 1.84. The carbon fiber had such an excellent compressive strength, specific resistivity and mechanical characteristics that the crystal size was 1.7 nm, the compressive strength was 4.96 GPa and the specific resistivity was $1.5 \times 10^{-3}$ Ω·cm.

Example 24

A carbon fiber bundle was obtained in the same way as Example 2, except changing the temperature at the second carbonizing step to 1950° C. and, after the treatment of the second carbonizing step, further as the third carbonizing step, adding a treatment, in nitrogen atmosphere, at a temperature of 2250° C., for 3 minutes under a draw ratio of 1.01 times.

Of the obtained carbon fiber bundle, the tensile strength of single fiber was 3.0 GPa, the tensile modulus was 370 GPa and the specific gravity was 1.95. The carbon fiber had such an excellent compressive strength, specific resistivity and mechanical characteristics that the crystal size was 2.5 nm, the compressive strength was 4.38 GPa and the specific resistivity was $1.0 \times 10^{-3}$ Ω·cm.

Example 25

A carbon fiber bundle was obtained in the same way as Example 12, except changing, in the third carbonizing step, the temperature to 2500° C. and the draw ratio to 1.03 times.

Of the obtained carbon fiber bundle, the tensile strength of single fiber was 2.8 GPa, the tensile modulus was 480 GPa and the specific gravity was 1.98. The carbon fiber had such an excellent compressive strength, specific resistivity and mechanical characteristics that the crystal size was 3.3 nm, the compressive strength was 3.88 GPa and the specific resistivity was $08 \times 10^{-3}$ Ω·cm.

Example 26

A carbon fiber bundle was obtained in the same way as Example 12, except changing, in the third carbonizing step, the temperature to 2750° C. and the draw ratio to 1.09 times.

Of the obtained carbon fiber bundle, the tensile strength of single fiber was 2.6 GPa, the tensile modulus was 600 GPa and the specific gravity was 2.02. The carbon fiber had such an excellent compressive strength, specific resistivity and mechanical characteristics that the crystal size was 4.0 nm, the compressive strength was 3.55 GPa and the specific resistivity was $0.7 \times 10^{-3}$ Ω·cm.

Comparative Example 3

A DMSO solution of 20 wt % PAN, of which molar copolymerization ratio of AN and itaconic acid was 99.7:0.3 and weight average molecular weight by GPC measurement (Mw) was 300,000, was prepared. After this solution was coagulated with a coagulation liquid of 60° C. consisting of DMSO/water=50:50, drawn 5 times in hot water and after washed further with water, it was imparted with a silicone oil agent. This was dried in a dry heat device of 180° C. under a draw ratio of 1 for 3 minutes. Steam was introduced to a tubular treating member of 40 cm, 5 units having a 3 mm circular aperture were respectively provided to the both ends of this tube, and further a drain treatment portion was provided. A heater was provided around the tubular treating member to prevent an accumulation of drain. The steam pressure was 4.0 kg/cm², and the steam temperature was 150° C. After it was subjected to a drawing of 3 times for $4 \times 10^{-3}$ seconds by this steam, heat treated by a hot roller of 180° C. to make its water content 2.5% and wound. This fiber was subjected to a stabilization treatment at 240° C. for 60 minutes under a draw ratio of 1.1 times and obtained a flame resistant fiber bundle.

The tensile strength single fiber of the obtained flame resistant fiber bundle was 2.5 cN/dtex, the elongation at break was 15% and, when the flame resistance was evaluated, it was found that the fiber had such an excellent flame resistance that it turned red hot without burning. The degree of orientation was 76% and the specific gravity was 1.28 and it was found that, although the molecular orientation was high, the structural denseness was insufficient.

Furthermore, the obtained flame resistant fiber bundle was, as the first carbonizing step, pre-carbonized in nitrogen atmosphere at a temperature of 650° C. for 2 minutes under a draw ratio of 1 time and then, as the second carbonizing step, subjected to a carbonization treatment in nitrogen atmosphere at a temperature of 1450° C. for 3 minutes under a draw ratio of 0.96 times to obtain a carbon fiber bundle. Of the obtained carbon fiber bundle, the tensile strength of single fiber was 2.9 GPa, the tensile modulus was 190 GPa, the specific gravity was 1.74. The crystal size was 1.9 nm, the compressive strength was 4.88 GPa and the specific resistivity was $1.7 \times 10^{-3}$ Ω·cm and, although the carbon fiber was excellent in tensile properties, the performances of compressive strength and specific resistivity were insufficient.

Comparative Example 4

A carbon fiber bundle was obtained in the same way as Comparative example 2, except changing the temperature at the second carbonizing step to 1950° C. and, after the treatment of the second carbonizing step, further as the third carbonizing step, adding a treatment, in nitrogen atmosphere, at a temperature of 2250° C. for 3 minutes under a draw ratio of 1.01 times.

Of the obtained carbon fiber bundle, the tensile strength of single fiber was 2.7 GPa, the tensile modulus was 320 GPa and the specific gravity was 1.75. The crystal size was 3.5 nm, the compressive strength was 3.72 GPa and the specific resistivity was $1.1 \times 10^{-3}$ Ω·cm and, although the carbon fiber was excellent in tensile properties, the performances of compressive strength and specific resistivity were insufficient.

Comparative Example 5

A carbon fiber bundle was obtained in the same way as Comparative example 2, except changing, in the third carbonizing step, the temperature to 2500° C. and the draw ratio to 1.03 times.

Of the obtained carbon fiber bundle, the tensile strength of single fiber was 2.5 GPa, the tensile modulus was 430 GPa and the specific gravity was 1.85. The crystal size was 4.3 nm, the compressive strength was 3.27 GPa and the specific resistivity was $0.9 \times 10^{-3}$ Ω·cm and, although the carbon fiber was excellent in tensile properties, the performances of compressive strength and specific resistivity were insufficient.

Comparative Example 6

A carbon fiber bundle was obtained in the same way as Comparative example 2, except changing, in the third carbonizing step, the temperature to 2750° C. and the draw ratio to 1.09 times.

Of the obtained carbon fiber bundle, the tensile strength of single fiber was 2.3 GPa, the tensile modulus was 550 GPa and the specific gravity was 1.91. The crystal size was 5.9 nm, the compressive strength was 2.52 GPa and the specific, resistivity was $0.8 \times 10^{-3}$ Ω·cm and, although the carbon fiber was excellent in tensile properties, the performances of compressive strength and specific resistivity were insufficient.

INDUSTRIAL APPLICABILITY

The flame resistant fibers can be widely employed as fire resistant fiber articles. By subjecting the flame resistant fiber to a carbonization treatment to make into a high performance carbon fiber, it can be widely employed as a reinforcing fiber of composite materials.

The invention claimed is:

1. A flame resistant fiber which comprises:
    a black flame resistant polymer 1) modified by an amine-based compound and an oxidizing agent, 2) is polar organic solvent soluble, and 3) has a structure with signals in 150-200 ppm measured by a 13-C nuclear magnetic resonance (NMR), wherein a molecular orientation by wide angle X-ray measurement is 65% or more and a specific gravity is 1.35 or more.
2. A flame resistant fiber which comprises:
    a black flame resistant polymer 1) modified by an amine-based compound and an oxidizing agent, 2) is polar organic solvent soluble, and 3) has a structure with signals in 150-200 ppm measured by a 13-C nuclear magnetic resonance (NMR), wherein a coefficient of variation of cross-section areas of single fiber is 25% or less.

* * * * *

UNITED STATES PATENT AND TRADEMARK OFFICE
CERTIFICATE OF CORRECTION

| | |
|---|---|
| PATENT NO. | : 7,976,945 B2 |
| APPLICATION NO. | : 11/989366 |
| DATED | : July 12, 2011 |
| INVENTOR(S) | : Kawakami et al. |

It is certified that error appears in the above-identified patent and that said Letters Patent is hereby corrected as shown below:

<u>In Column 22</u>
At line 18, please change "0.1" to --1--.

Signed and Sealed this
Seventeenth Day of January, 2012

David J. Kappos
*Director of the United States Patent and Trademark Office*